(12) United States Patent
Pulnikov

(10) Patent No.: US 8,253,295 B2
(45) Date of Patent: Aug. 28, 2012

(54) SCHEMES OF INTERCHANGEABLE WINDINGS OF ELECTRICAL MACHINES

(75) Inventor: Sergey Pulnikov, Villingen-Schwenningen (DE)

(73) Assignee: Sergey Pulnikov, Villingen-Schwenningen (DE)

( * ) Notice: Subject to any disclaimer, the term of this patent is extended or adjusted under 35 U.S.C. 154(b) by 113 days.

(21) Appl. No.: 13/021,765

(22) Filed: Feb. 6, 2011

(65) Prior Publication Data

US 2011/0127875 A1    Jun. 2, 2011

Related U.S. Application Data

(62) Division of application No. 12/355,858, filed on Jan. 19, 2009, now Pat. No. 7,913,375.

(51) Int. Cl.
*H02K 1/00* (2006.01)
(52) U.S. Cl. .................................................. 310/179
(58) Field of Classification Search .................. 310/179, 310/184, 198
See application file for complete search history.

(56) References Cited

U.S. PATENT DOCUMENTS

| | | | | |
|---|---|---|---|---|
| 5,723,930 A * | 3/1998 | Ho et al. | | 310/179 |
| 6,417,592 B2 * | 7/2002 | Nakamura et al. | | 310/184 |
| 6,759,780 B2 * | 7/2004 | Liu et al. | | 310/184 |
| 2007/0194650 A1 * | 8/2007 | Ito et al. | | 310/179 |
| 2008/0272667 A1 * | 11/2008 | Ionel et al. | | 310/156.83 |

* cited by examiner

*Primary Examiner* — Nguyen N Hanh

(57) ABSTRACT

Winding diagrams, in which there is no intersection of end-windings in space and which are suitable for interchangeable windings of electrical machines, are considered in the proposed invention. Winding diagrams of a three-phase, two-layer concentric winding with a 120° phase zone and a three-phase, three-layer concentric winding with a 180° phase zone are considered. The scheme of a three-phase two-layer concentric winding with 120° phase with a linear distribution of turns in phase coils is offered for improvement of MMF distribution. The scheme of a three-phase, three-layer concentric winding with 180° phase zone with trapezoidal distribution of turns in phase coils is also proposed for improvement of MMF distribution.

4 Claims, 18 Drawing Sheets a)

b)

a)

b)

a) Series connection of coils b) Parallel connection of coils a) Series connection of coils b) Parallel connection of coils a)

b)

a) Series connection of coils b) Parallel connection of coils a) Series connection of coils b) Parallel connection of coils

SCHEMES OF INTERCHANGEABLE WINDINGS OF ELECTRICAL MACHINES

CROSS-REFERENCE TO RELATED APPLICATIONS

This application is divisional of application Ser. No. 12/355,858 filed Jan. 19, 2009.

FIELD OF INVENTION

This invention is related to the field of electrical engineering, to the field of electrical machines and in particular to the field of winding diagrams of electrical machines.

BACKGROUND OF INVENTION

The technology of production of interchangeable windings of electrical machines is described in US 20100181860. Windings of electrical machines are made with separately from a stator at use of the specified technology (FIG. 1). These winding represent a solid body with strictly determined geometrical sizes and strictly determined physical properties, such as number of phases, number of slots, number of poles, number of coils in a phase, the winding diagram, number of layers of a winding, diameter of a wire, active and inductive resistance of a phase (FIG. 2). The winding made by means of specified technology is simply inserted or pressed into a stator (FIGS. 3, 4).

Preliminary investigations have shown, what windings of electrical machines of an alternating current with 120° and 180° phase zone in case of use of the above mentioned technology have more compact free parts, than traditional windings of electrical machines with 60° phase zone. Investigations also have shown, what the most convenient for the technology of production of interchangeable windings of electrical machines are windings, in which there are no intersections of winding overhangs.

Winding diagrams of most well approaching for interchangeable windings of electrical machines are the subject of the present invention.

SUMMARY OF INVENTION

The winding diagram of a three-phase two-layer concentric winding with 120° phase zone for interchangeable windings of electrical machines of an alternating current is offered in the present invention. The intersection of winding overhangs is absent in such winding. Each phase of the winding occupies in one layer of 120 electrical degrees. Three phases, which occupy consistently 360 electrical degrees depending on number of poles of the winding, are present at each layer. Coils of one layer are displaced in space concerning coils of other layer on 180 electrical degrees. The minimum number of slots equal 6. The winding diagram represents the winding of the four-pole electrical machine or the winding of the electrical machine with number of poles, multiple to four, at accordant connection of coils of phases. The winding diagram represents the winding of the two poles electrical machine or the winding of the electrical machine with number of poles, multiple to two, at counter connection of coils of phases.

The winding diagram of a three-phase three-layer concentric winding with 180° phase zone is offered for interchangeable windings of electrical machines also. The intersection of winding overhangs also is absent in such winding. Each phase of a winding occupies one layer. Coils of one layer are displaced in space concerning coils of other layer on 120 electrical degrees. The minimum number of slots equal 12. The winding diagram represents the winding of the two-pole electrical machine or the winding of the electrical machine with number of poles, multiple to two, at counter connection of coils of phases. The winding diagram represents the winding of the four-pole electrical machine or the winding of the electrical machine with number of poles, multiple to four, at accordant connection of coils of phases.

The winding diagram of the three-phase two-layer concentric winding with 120° phase zone with linear distribution of turns in coils of a phase is offered in case of need of increasing of EMF of a phase and in case of an improvement of a distribution of MMF for interchangeable windings of electrical machines. The sum of turns in the each slot of the three-phase winding will remain a constant in this case.

The winding diagram of the three-phase three-layer concentric winding with 180° phase zone with trapezoidal distribution of turns in coils of a phase is offered in case of need increasing of EMF of a phase and in case of an improvement of distribution of MMF for interchangeable windings of electrical machines. The sum of turns in the each slot of the three-phase winding will remain a constant in this case.

DETAILED DESCRIPTION

Figure 1:
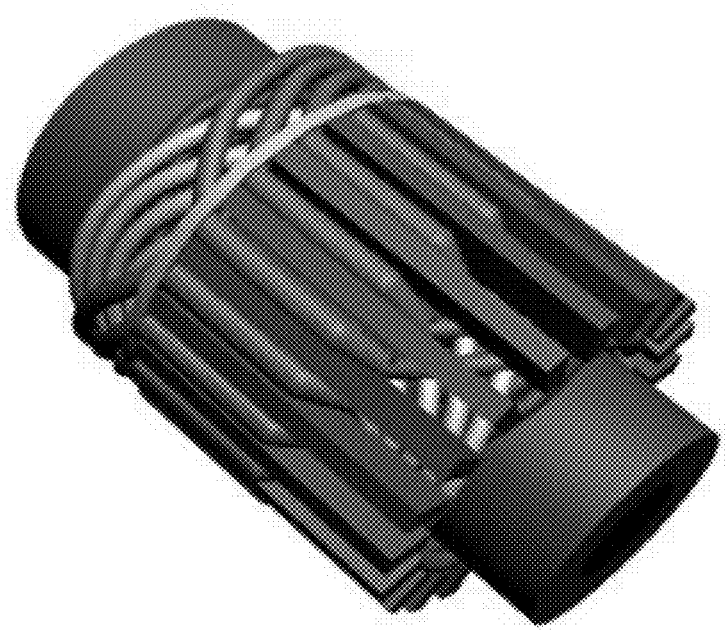
FIG. 1 shows the process of wounding of interchangeable winding of electrical machines.
Figure 2:
FIG. 2 shows the ready interchangeable winding of electrical machines.
Figure 3:
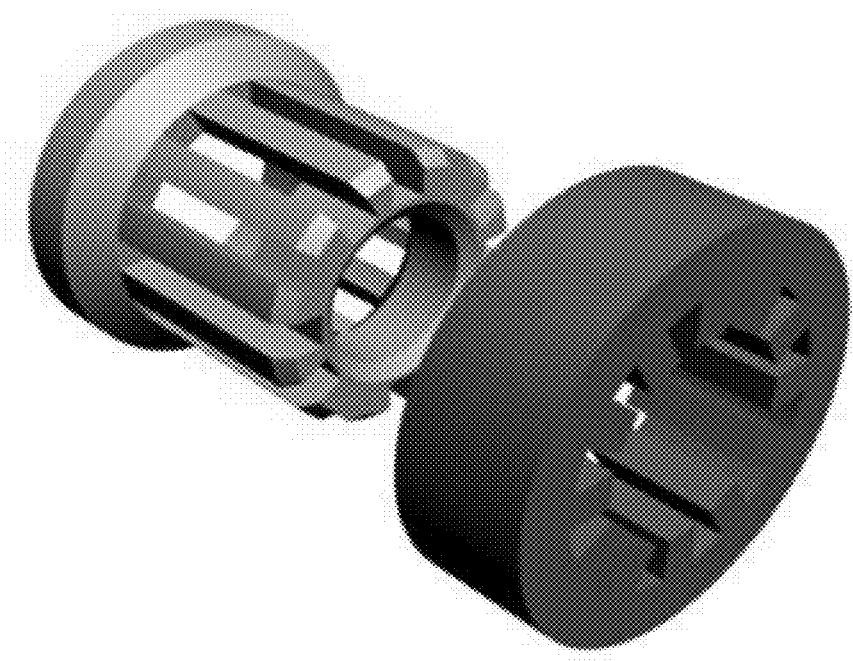
FIG. 3 shows the assemblage process of the stator with interchangeable winding.
Figure 4:
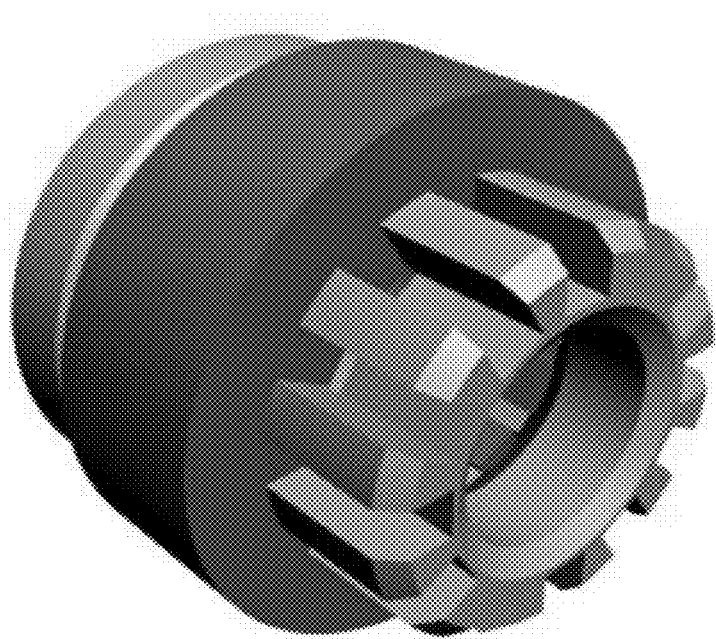
FIG. 4 shows the ready stator with interchangeable winding.
Figure 5:
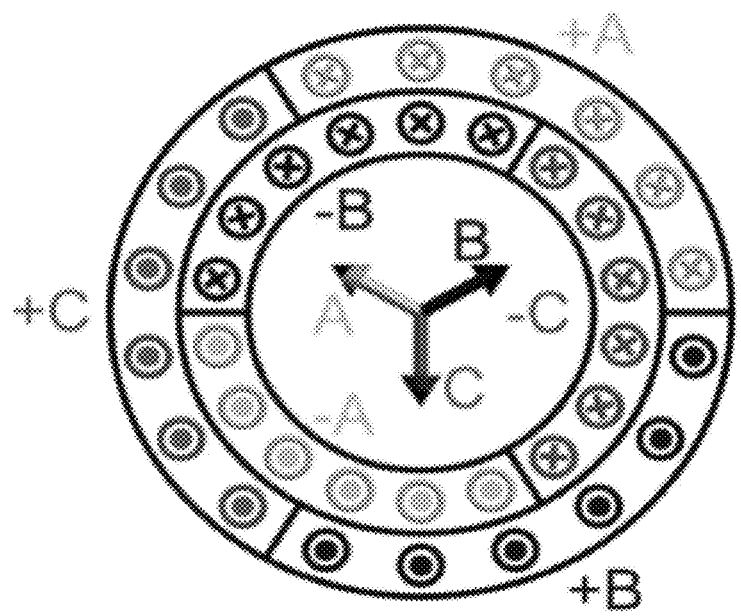
FIG. 5 shows the two-poles, three-phase winding with 120° phase zone.
Figure 6:
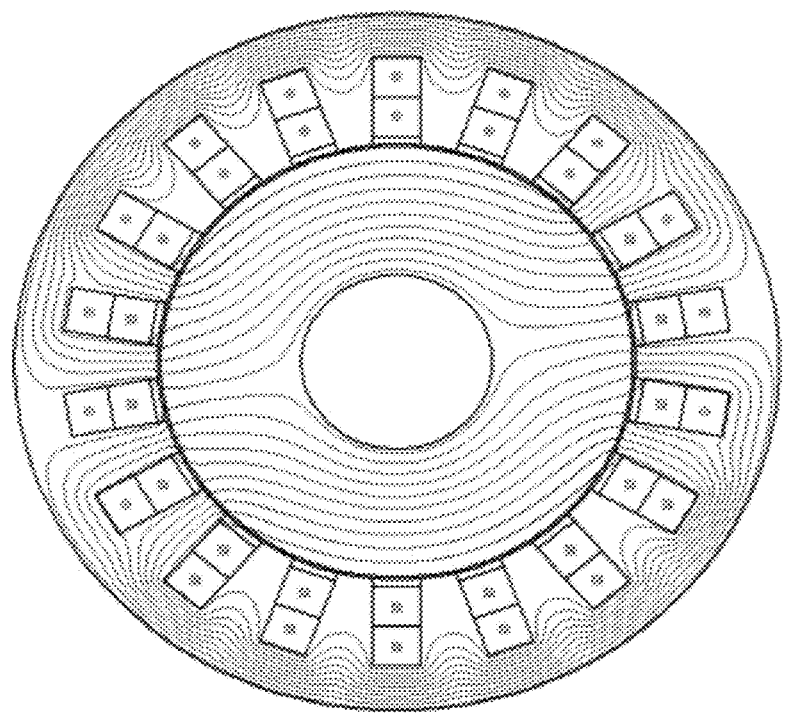
FIG. 6 shows the picture of the magnetic field of two-pole, three-phase winding with 120° phase zone.

The well-known principle scheme of the two-pole winding with 120° phase zone and the picture of distribution of the magnetic field, created by this winding, are presented on FIG. 5 and FIG. 6. In the winding diagram, presented on FIG. 5, one side of coils of one phase is located in one layer, and other side of coils of this phase is located in other layer. Coils in the given winding can have a diametral pitch and can represent by itself the concentric coils. Anyway, winding overhangs of the given winding intersect in space. The current in the slots, occupied with coils of one phase, occupying a space in 120° electrical degrees, has one direction.

Figure 7:
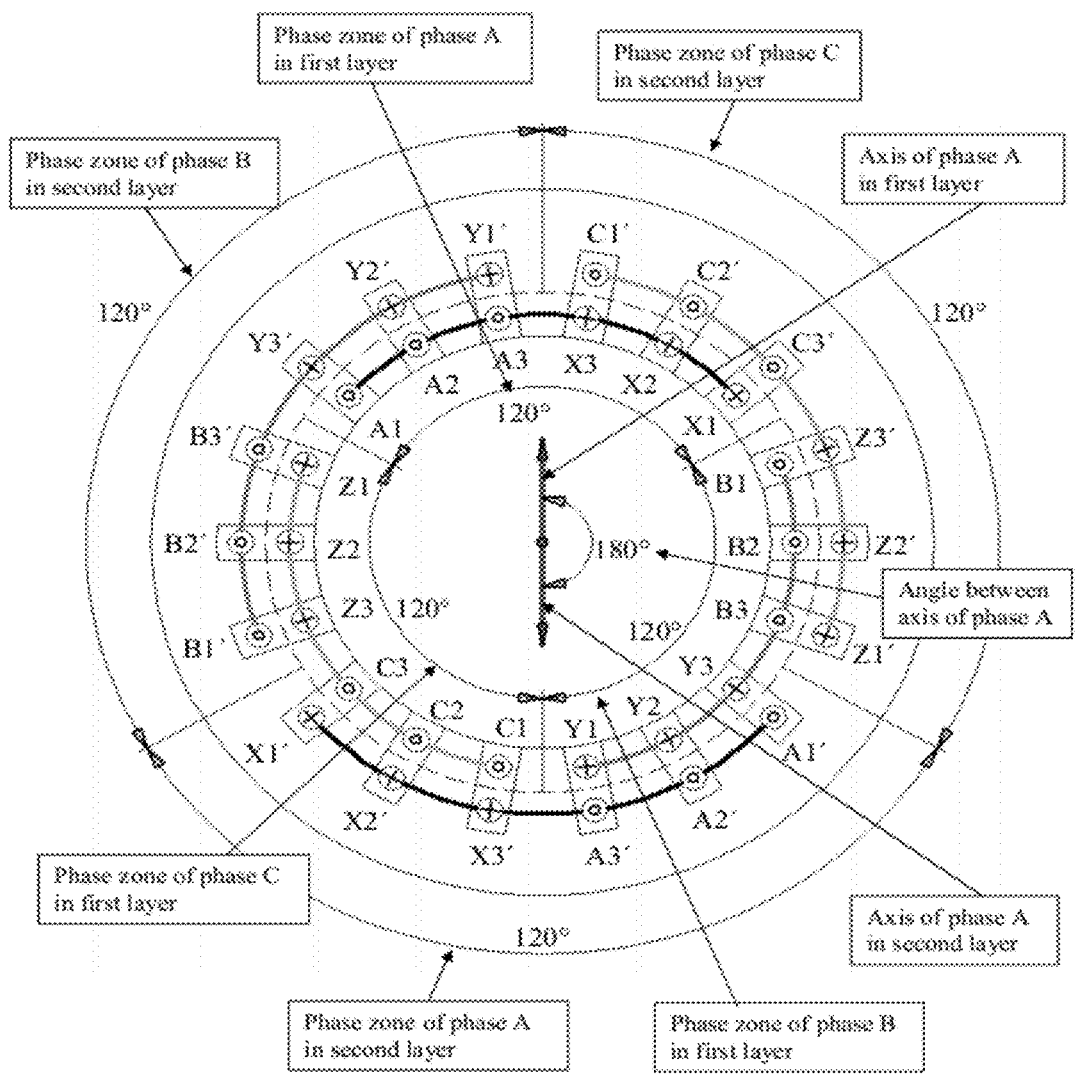
FIG. 7 shows the principle scheme of two-layer, three-phase winding with concentric coils, with 120° phase zone.
Figure 8:
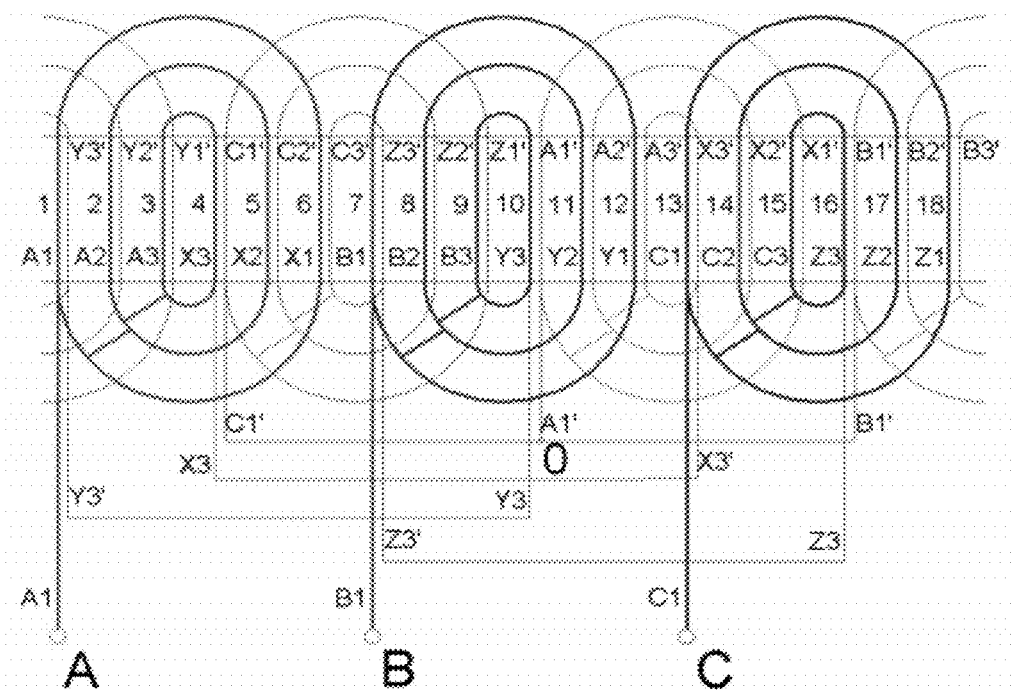
FIG. 8 shows the winding diagram of two-layer, three-phase, two-pole and four-pole winding with concentric coils, with 18 slots, with 120° phase zone.
Figure 8:
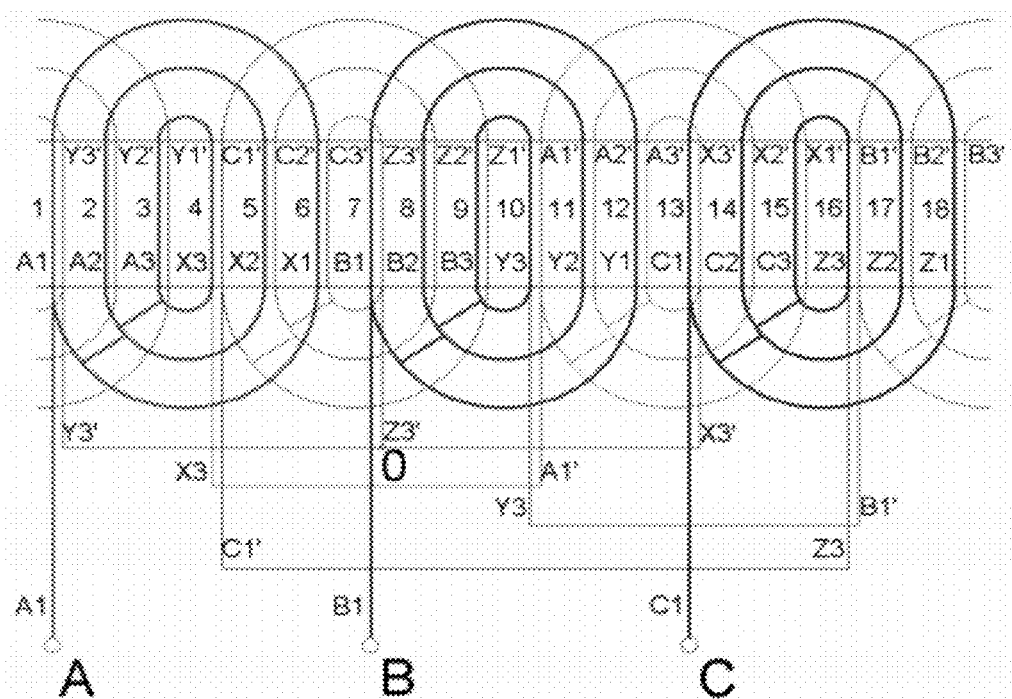

A principle scheme of a two-layer, three-phase alternating current winding with concentric coils, with 18 slots, with 120° phase zone, is presented on FIG. 7. A winding diagram of a two-layer three-phase, two-pole and four-pole concentric winding with 18 slots, with 120° phase zone, is presented on FIG. 8. Coils of one phase are located in one layer and connected concentrically (FIG. 8) in the scheme, offered in the given invention, unlike well-known scheme FIG. 5. As well as in the well-known scheme (FIG. 5) all concentric coils have equal number of turns. In a three-phase winding, each phase has two concentric coils, located in different layers (FIG. 7, FIG. 8). A cross-section of a stator of an electrical machine with a three-phase winding of alternating current with concentric coils is shown on FIG. 7. A positive direction of currents in coils (towards us) and a negative direction of currents in coils (away from us) for all three phases all in the same key is specified on FIG. 7. It is a standard approach for an estimation of a relative displacement of axes of phases in space. The sides of coils with the positive direction of current are designated: for the phase A-A1, A2, A3; for the phase B-B1, B2, B3; for the phase C-C1, C2, C3 (FIG. 7, FIG. 8). The sides of coils with the negative direction of current are designated: for the phase A-X1, X2, X3; for the phase B-Y1, Y2, Y3; for the phase C-Z1, Z2, Z3 (FIG. 7, FIG. 8). The concentric coil of the phase A with the smallest slot pitch has the sides—A3 and X3. The following concentric coil of the phase A with a bigger slot pitch than the previous coil has the sides—A2 and X2. The last concentric coil of the phase A with the greatest slot pitch has the sides—A1 and X1. Conductors of concentric coils on FIG. 7 are conditionally connected by a line to show their accessory to one coil of a phase.

The concentric coil of the phase B with the smallest slot pitch has the sides—B3 and Y3. The following concentric coil of the phase B with a bigger slot pitch than the previous coil has the sides—B2 and Y2. The last concentric coil of phase B with the greatest slot pitch has the sides—B1 and Y1. The concentric coil of the phase C with the smallest slot pitch has the sides—C3 and Z3. The following concentric coil of the phase C with a bigger slot pitch than the previous coil has the sides—C2 and Z2. The last concentric coil of the phase C with the greatest slot pitch has the sides—C1 and Z1. One side of coils of one phase occupies half of phase zone. Other side of these coils is located in the same layer and occupies second half of phase zone (FIG. 7, FIG. 8). Coils of phase in other layer are connected in the similar manner. Coils of phases occupy a phase zone, which is equal 120 electrical degrees for the three-phase electrical machine. As one can see from FIGS. 7, 8, the current in half of slots of the concentric coil of a phase has one direction, and in other half of slots has an opposite direction. The coils of phases, located in one layer, are displaced relative each other on 120 electrical degrees in space for the three-phase electrical machine (FIG. 7, FIG. 8). The coils of one phase, located in different layers, are displaced on 180 electrical degrees in space. That is, the coils of one phase, which are situated in different layers, are located opposite. Axes of coils of one phase, being in different layers, are accordingly displaced in space on 180 electrical degrees. Coils of phases consist of concentric coils, connected in series. For example, coils A3-X3, A2-X2 and A1-X1 of the phase A are connected consistently and form the common coil of the phase A1-X3, located in one layer (FIG. 7, FIG. 8). Where A1 represents the coil beginning, and X3 represents the coil end. As one can see from drawings (FIG. 7, FIG. 8), the winding overhangs of such winding don't intersect in space.

If one connects the concentric coils of one phase, located in different layers, by counter manner, he would receive the scheme of the two-pole electrical machine (FIG. 8a). This means that it is necessary to connect the end X3 of the coil, located in the top layer of the winding (FIG. 7, FIG. 8a), with the end X3' of the coil, located in the bottom layer of the winding. Then beginning A1 of the coil, located in the top layer of the winding, will represent the phase beginning. Beginning A1' of the coil, located in the bottom layer of the winding, will represent the phase end. The winding diagram of the two-pole electrical machine for one phase is presented on FIG. 11. Similarly, it is necessary to connect phases B and C. The beginnings of phases will represent: A1, B1 and C1 (FIG. 7, FIG. 8a). Phases of winding can be connected in wye or in delta. Ends A1', B1' and C1' of phases are connected to the zero point 0 in case of wye-connection of phases (FIG. 7, FIG. 8a). The input wires of phases in the winding diagram we will definitively designate as A, B and C. As a result we will receive a winding diagram of a two-pole electrical machine (FIG. 8a). As it is known, a closed surface of the stator of a two-pole electrical machine occupies in space 360 electrical degrees. Obviously, the zone occupied by one concentric coil of the phase, located in one layer, takes 120 electrical degrees (FIG. 7). In this case, that is, in case of a two-pole electrical machine, the phase zone is also equal to 120 mechanical degrees.

Figure 9:
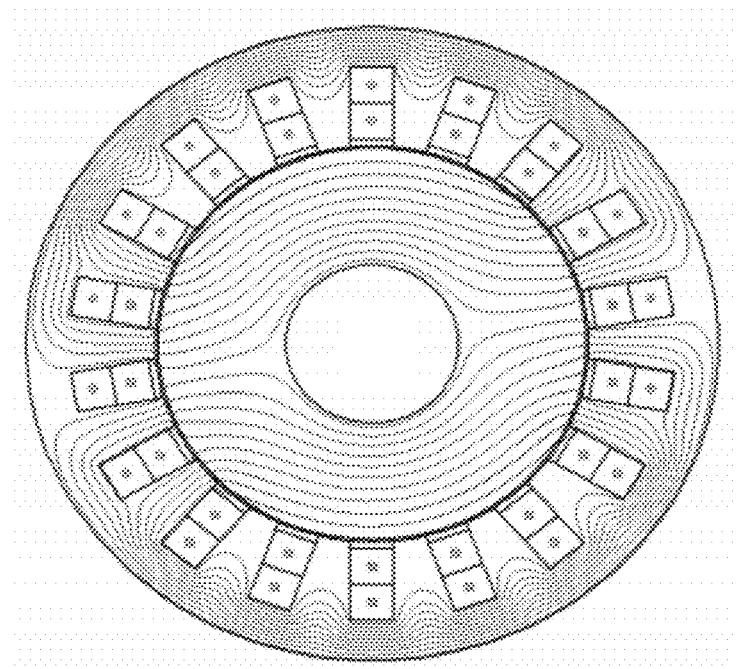
FIG. 9 shows the picture of the magnetic field of two-pole and four-pole, three-phase winding with concentric coils, with 120° phase zone.
Figure 9:
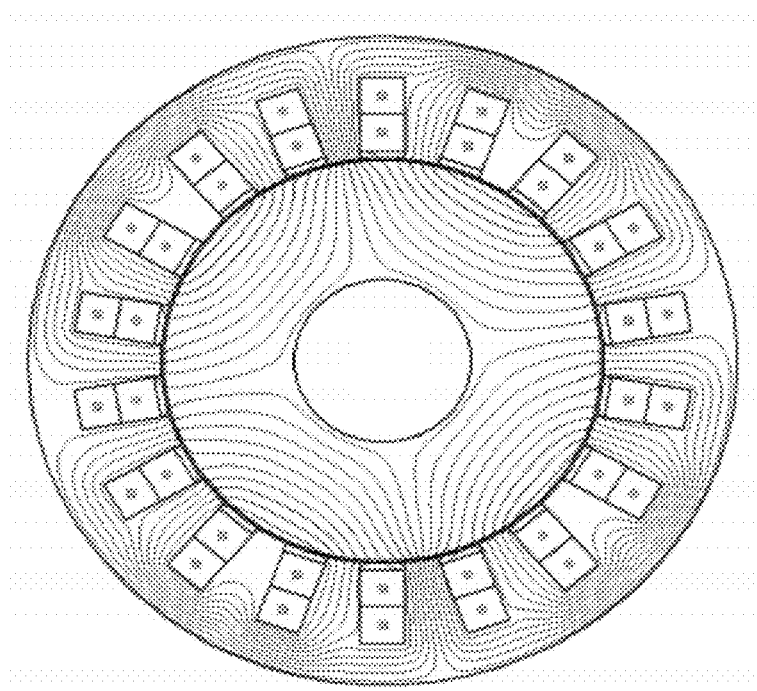

A winding diagram of two-layer, three phase, two-pole windings with concentric coils, with 18 slots, with 120° phase zone, is presented on FIG. 8a. A picture of distribution of the magnetic field, created by this winding, is presented on FIG. 9a. A winding diagram of two-layer, three phase, four-pole windings with concentric coils, with 18 slots, with 120° phase zone, is presented on FIG. 8b. A picture of distribution of the magnetic field, created by this winding, is presented on FIG. 9b.

Figure 10:
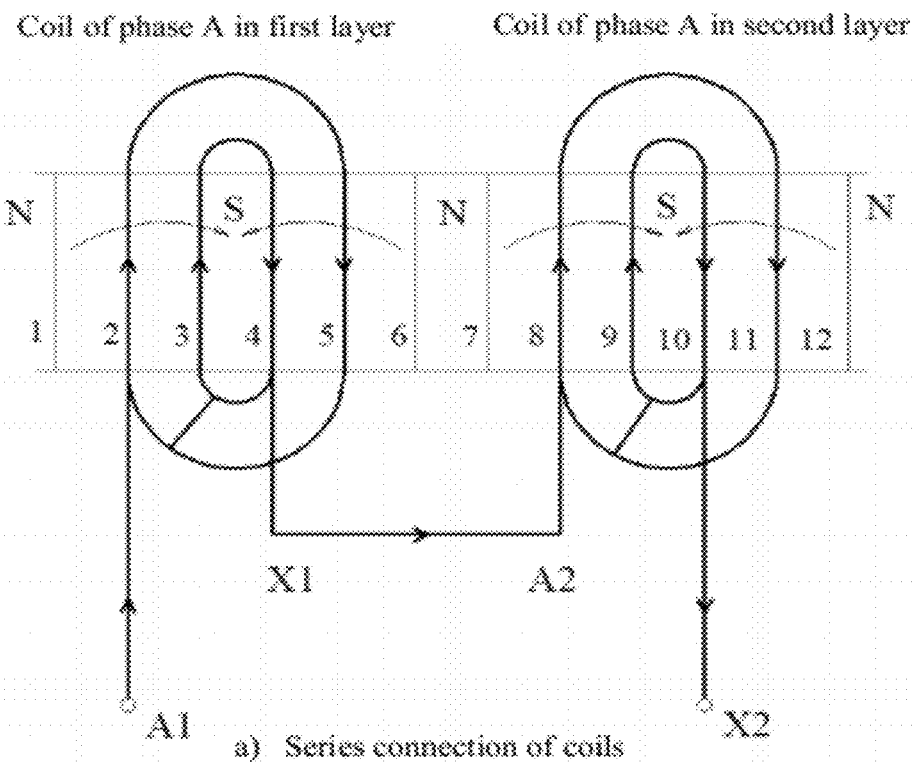
FIG. 10 shows the winding diagram of one phase, two-layer, three-phase, four-pole winding with concentric coils, with 12 slots, with 120° phase zone at series and parallel connection of coils of a phase.
Figure 10:
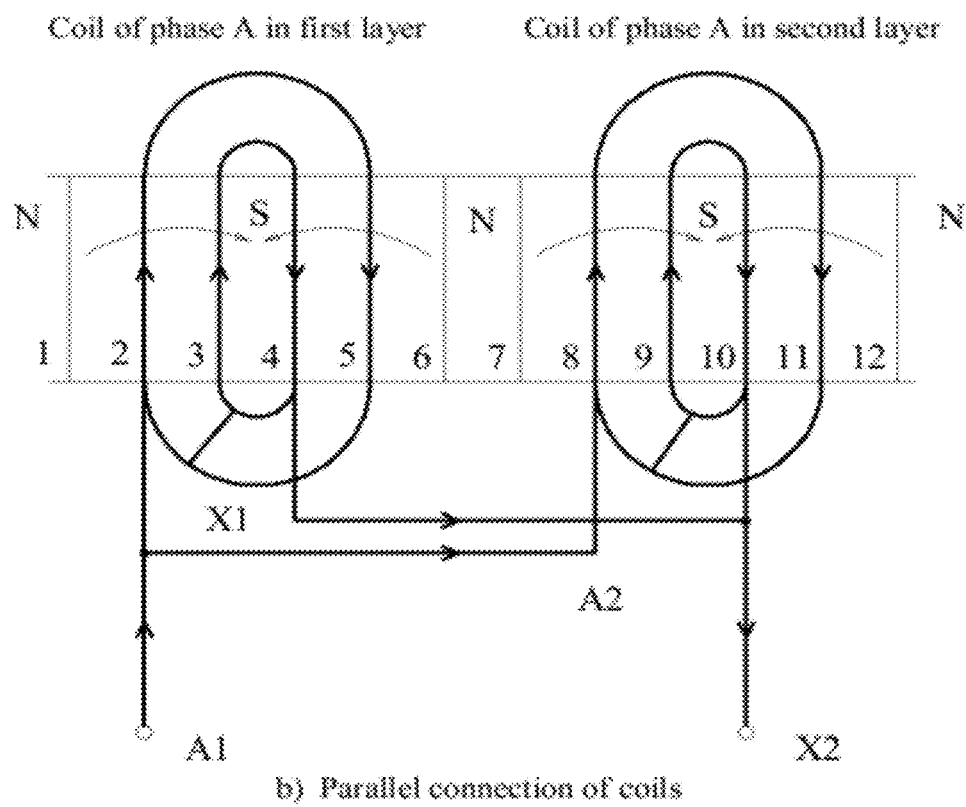

This winding diagram gives in the elementary case the four-pole electrical machine (FIG. 10) at concordant connection of coils of each phase, located in different layers. Given winding diagram at series and parallel connection of coils of the phase, located in different layers of a winding, for 12 slots of a winding, is shown on FIG. 10. The input wires of concentric coils of phases are designated (A1 and A2) (FIG. 10). The output wires of concentric coils of phases are designated (X1 and X2) (FIG. 10). The complete variant of the three phase, four-pole winding diagram with connection of phases of windings in wye is presented on FIG. 8b. For realization of the given scheme it is necessary to connect the end X3 of the coil, located in the top layer of the winding (FIG. 8b), with the end A1' of the coil, located in the bottom layer of the winding. Then beginning A1 of the coil, located in the top layer of a winding, will represent the phase beginning. The end X3' of the coil, located in the bottom layer of the winding, will represent the phase end. Similarly, it is necessary to make connections for phases B and C. The beginnings of phases will represent: A1, B1 and C1. Phases of the winding can be connected in wye or delta. Ends X3', Y3' and Z3' of the phases are connected to zero point 0 in case of wye-connection of phases. The input wires of phases in the scheme we will definitively designate as A, B and C.

Figure 11:
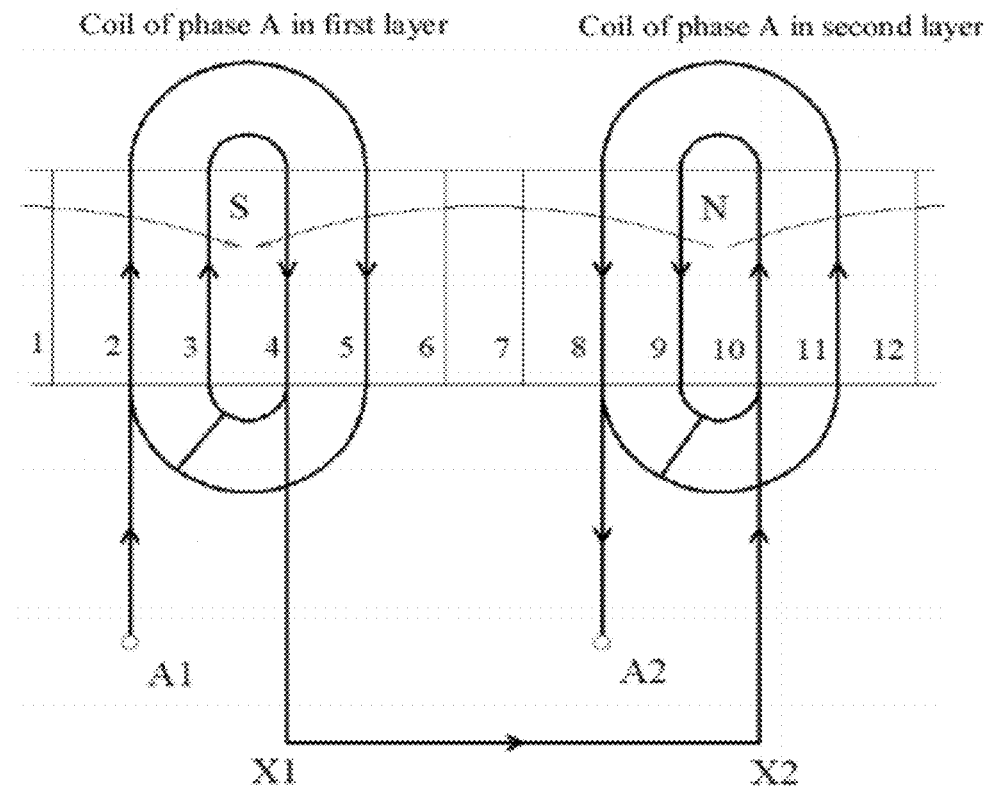
FIG. 11 shows the winding diagram of one phase, two-layer, three-phase, two-pole winding with concentric coils, with 12 slots, with 120° phase zone at series and parallel connection of coils of a phase.
Figure 11:
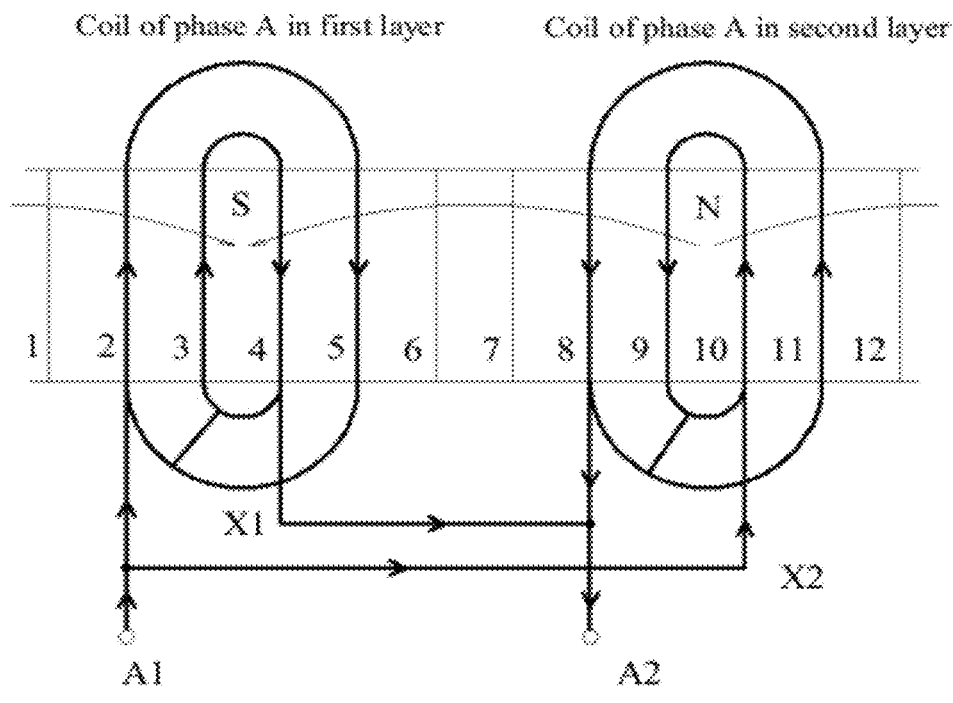

The winding diagram gives in the elementary case the two-pole electrical machine (FIG. 11) at counter connection of coils of each phase, located in different layers. The given winding diagram at series and parallel connection of coils of the phase, located in different layers of a winding, is shown on FIG. 11. The input wires of concentric coils of phases are designated (A1 and A2) (FIGS. 10, 11). The output wires of concentric coils of phases are designated (X1 and X2) (FIGS. 10, 11). The complete variant of the three phase, two-pole winding diagram with connection of phases of windings in wye is presented on FIG. 8a.

Thus, in the elementary variant of the winding diagram (the elementary scheme) of the offered two-layer winding there are six concentric coils for the three-phase scheme. Accordingly, each phase contains two concentric coils (FIG. 7, FIG. 8). In one layer of the winding there are three concentric coils, belonging to different phases. A concentric coil of a phase, located in one layer, in the basic variant occupies a phase zone of 120 mechanical degrees which corresponds to 120 electrical degrees for the two-pole scheme (FIG. 7, FIG. 8a). The coils of phases with the same name located in different layers of the winding, are displaced in space by 180 mechanical degrees for the elementary variant of the scheme (FIG. 7, FIG. 8).

A distinctive feature of the given winding diagram is that at a counter connection of coils of a phase, located in different layers, we achieve a two-pole (2p=2) electrical machine (FIG. 8a, FIG. 11). At concordant connection of coils of phase, located in different layers, we achieve a four-pole (2p=4) electrical machine (FIG. 8b, FIG. 10). Thus, the number of concentric coils in the scheme does not change. Only the way of connection of coils of one phase changes. As the same scheme can give a two-pole and a four-pole electrical machine in the basic case, for the size of the phase zone we take the size corresponding to the phase zone in mechanical degrees. In other words, for the size of the phase zone we take the size corresponding to the phase zone for a two-pole electrical machine.

It is obvious that if we increase the number of concentric coils of the winding diagram in comparison with the elementary variant (the elementary scheme) by any number of times, for example by k times, as a result we would achieve an electrical machine with a number of poles equal (2p=2·k) at a counter connection of coils of the phase or with a number of poles equal (2p=4·k) at a concordant connection of coils of the phase. It is a fact of common knowledge in the theory of windings of electrical machines. Here k shows the number of elementary winding diagrams (elementary schemes) in the whole winding diagram of the winding (the whole scheme of winding). The phase zone of the coil of one phase, located in one layer, in this case will be defined from the two-pole base variant (2p=2), that is for the scheme of the winding with a number of poles equal (2p=2·k). The phase zone of the coil of one phase, located in one layer, hence will be equal to 120 electrical degrees for any number of poles of a three-phase winding (see Table 1). The coils of the phases with the same name, located in different layers of the winding, will be displaced in space by 180 electrical degrees for any number of poles of a three-phase winding.

TABLE 1

| | Number of layers of winding n, (n = 2) | |
|---|---|---|
| Number of poles | $2p = 2k, k = 1, 2, 3, \ldots$ where k – the number of elementary schemes in whole scheme of winding | $2p = 4k, k = 1, 2, 3, \ldots$ where k – the number of elementary schemes in whole scheme of winding |
| Number of coils in one layer | $N_k = km$, where m – numbers of phases | $N_k = km$, where m – numbers of phases |
| Number of coils in one layer, which belong to one phase | $N_{kph} = k$ | $N_{kph} = k$ |
| Total number of coils | $M_k = nmk = 2mk$ | $M_k = nmk = 2mk$ |
| Number of coils, which belong to one phase | $M_{kph} = 2k$ | $M_{kph} = 2k$ |
| Phase zone for one concentric coil in electrical degrees | $\alpha_w = \dfrac{360k}{m} = \dfrac{360}{m}$ for m = 3 $\alpha_w = 120°$ | $\alpha_w = \dfrac{360k}{m} = \dfrac{360}{m}$ for m = 3 $\alpha_w = 120°$ |
| Number of slots in winding | $Z = 2mki$, $i = 2, 3, 4, \ldots$ $Z = 12, 18, 24, 30, \ldots$ | $Z = 2mki$, $i = 2, 3, 4, \ldots$ $Z = 12, 18, 24, 30, \ldots$ |
| Number of slots per pole and per phase | $q = \dfrac{Z}{2pm} = \dfrac{2 \cdot 3 \cdot k \cdot i}{2 \cdot k \cdot 3} = i$ $q = 2, 3, 4, 5, \ldots$ | $q = \dfrac{Z}{2pm} = \dfrac{2 \cdot 3 \cdot k \cdot i}{4 \cdot k \cdot 3} = \dfrac{i}{2}$ $q = 1, \dfrac{3}{2}, 2, \dfrac{5}{2}, \ldots$ |

TABLE 2

| | Number of layers of winding n = 2, m = 3 | |
|---|---|---|
| Number of poles | $2p = 2$ | $2p = 4$ |
| Number of coils in one layer | $N_k = 3$ | $N_k = 3$ |
| Number of coils in one layer, which belong to one phase | $N_{kph} = 1$ | $N_{kph} = 1$ |
| Total number of coils | $M_k = 6$ | $M_k = 6$ |
| Number of coils, which belong to one phase | $M_{kph} = 2$ | $M_{kph} = 2$ |
| Phase zone for one concentric coil in electrical degrees | $\alpha_w = 120°$ | $\alpha_w = 120°$ |

TABLE 2-continued

Number of layers of winding n = 2, m = 3

| | | |
|---|---|---|
| Number of slots in winding | $Z = 2mki, i = 2$<br>$Z = 12$ | $Z = 2mki, i = 2$<br>$Z = 12$ |
| Number of slots per pole and per phase | $q = \dfrac{Z}{2pm} = \dfrac{2 \cdot 3 \cdot k \cdot i}{2 \cdot k \cdot 3} = i$<br>$q = 2$ | $q = \dfrac{Z}{2pm} = \dfrac{2 \cdot 3 \cdot k \cdot i}{4 \cdot k \cdot 3} = \dfrac{i}{2}$<br>$q = 1$ |

The four-pole winding diagram of the given winding has the maximum pitch of a winding, which is equal $$y_{max} = \frac{4}{3}\tau,$$

where τ—pole division. The average pitch of the winding for the four-pole scheme is equal $$y_{av} = \frac{2}{3}\tau.$$

The two-pole winding diagram of the given winding has the maximum pitch of a winding, which is equal $$y_{max} = \frac{2}{3}\tau.$$

The average pitch of the winding for the two-pole winding diagram is equal $$y_{av} = \frac{1}{3}\tau.$$

It is obvious that the four-pole winding diagram for the given winding is more preferable from the point of view of efficiency of use of the winding.

The basic properties of a two-layer, m-phase winding with concentric coils for the two-pole and four-pole winding diagram are presented in Table 1.

The basic properties of a two-layer three-phase winding with concentric coils, with 12 slots for the two-pole and four-pole elementary winding diagram are presented in Table 2.

Figure 12:
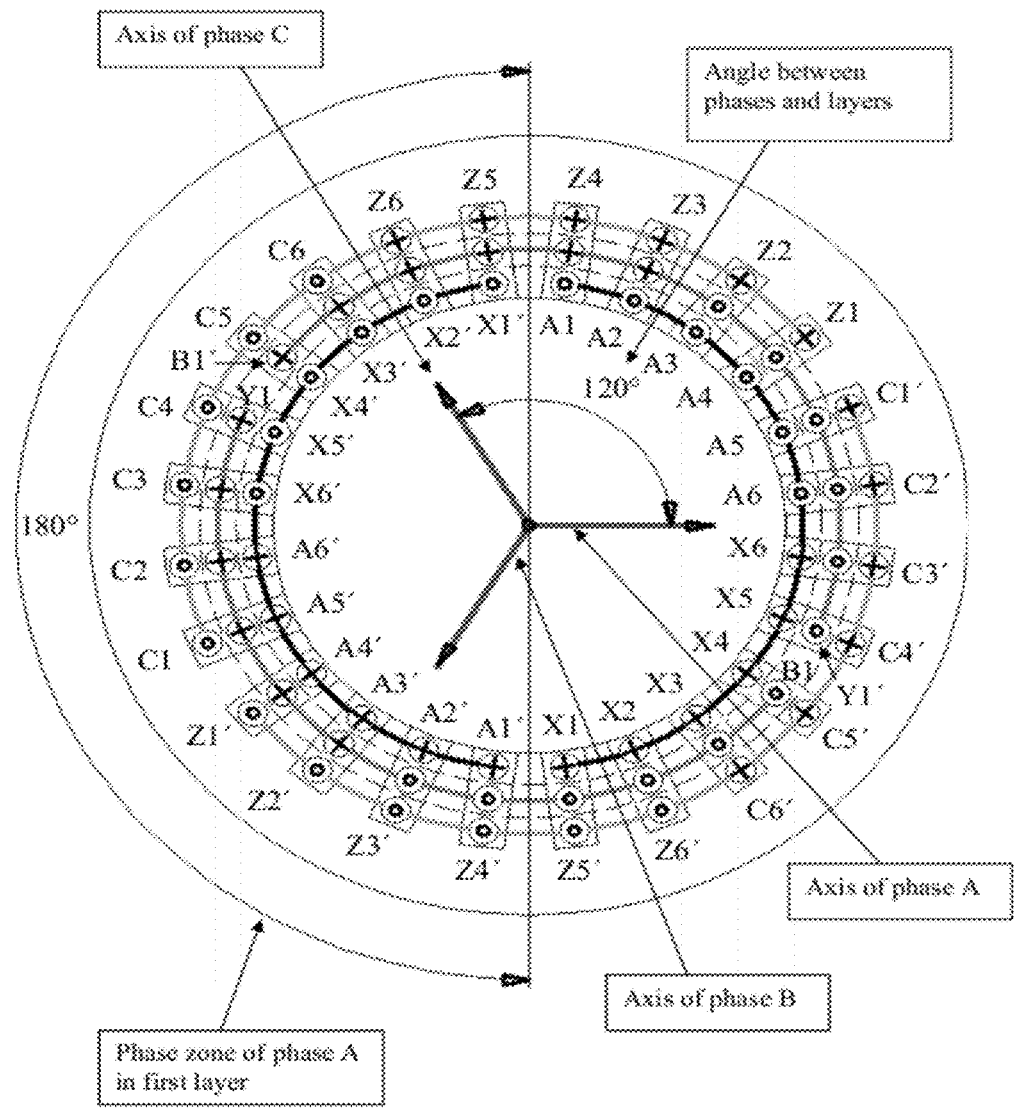
FIG. 12 shows the principle scheme of three-layer, three-phase winding with concentric coils, with 180° phase zone.
Figure 13:
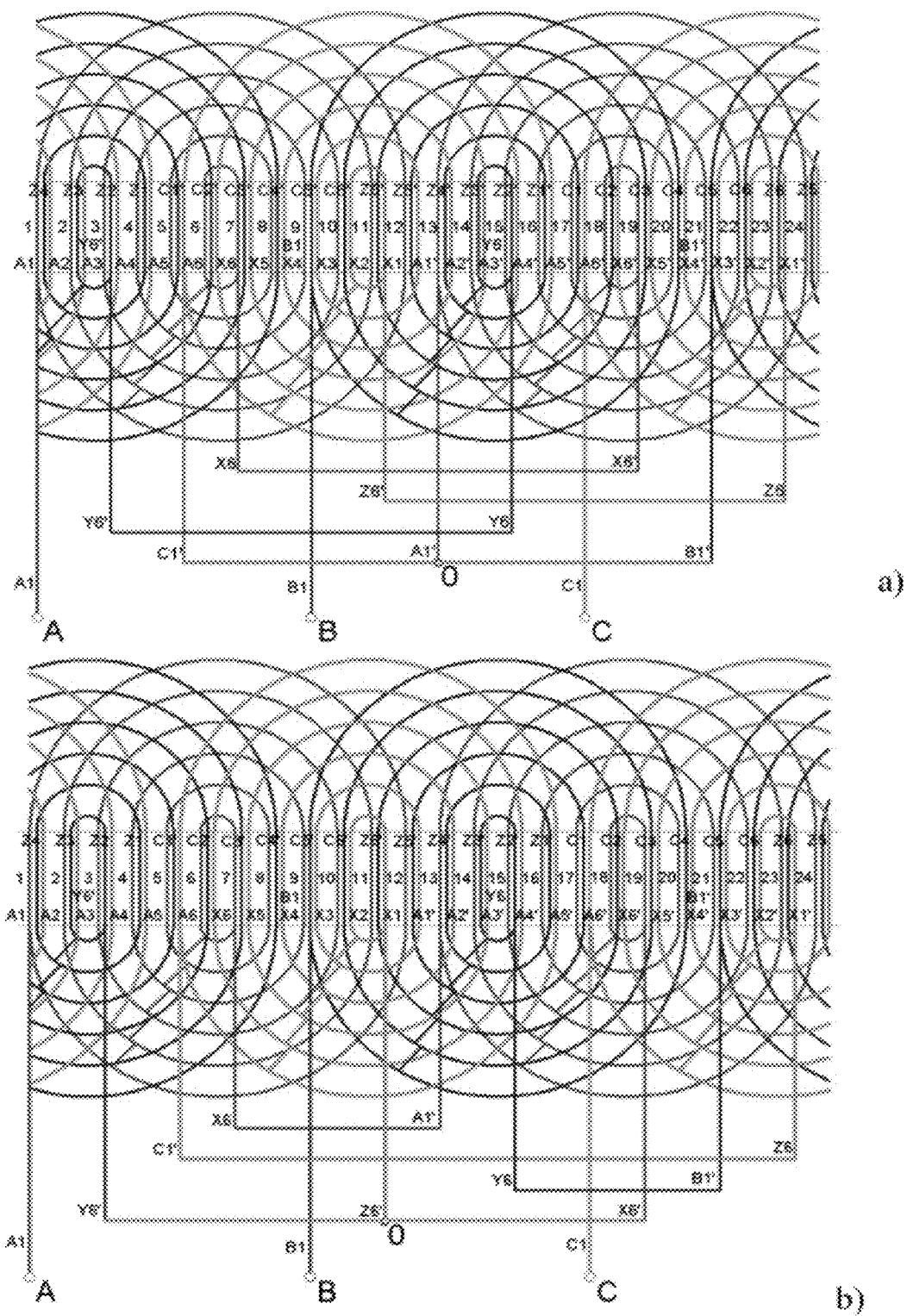
FIG. 13 shows the winding diagram of three-layer, three-phase, two-pole and four-pole winding with concentric coils, with 24 slots, with 180° phase zone.
Figure 14:
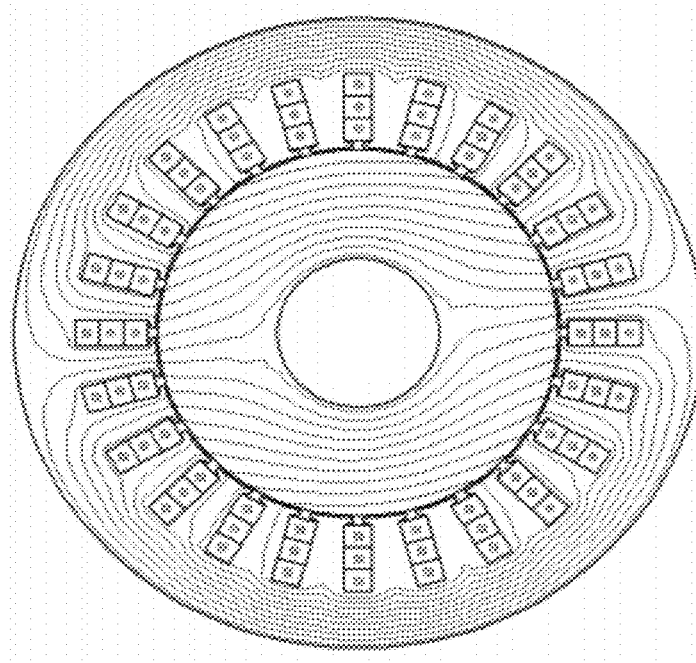
FIG. 14 shows the picture of the magnetic field of two-pole and four-pole, three-phase winding with concentric coils, with 180° phase zone.
Figure 14:
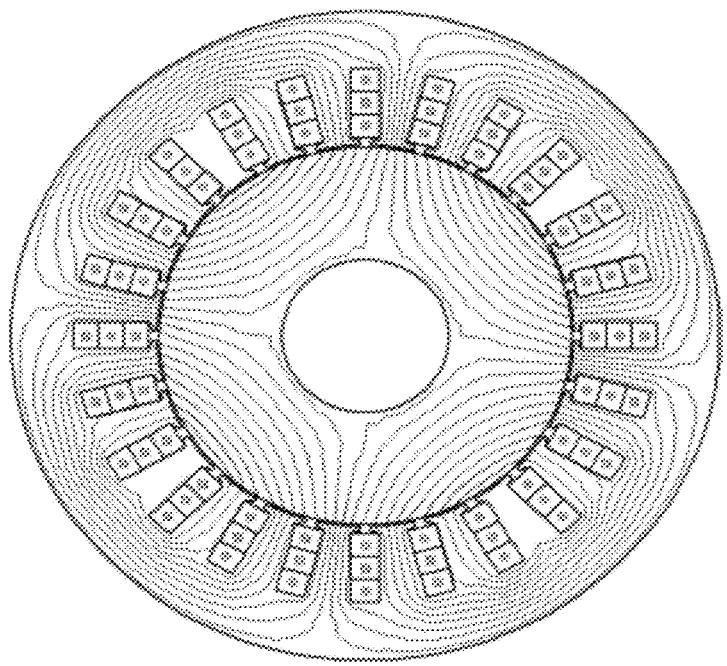

The principle scheme of a three-layer, three-phase alternating current winding with concentric coils, with 24 slots, with 180° phase zone, is presented on FIG. 12. The winding diagrams of a three-layer, three-phase, two-pole and four-pole, concentric winding with 24 slots, with 180° phase zone, is presented on FIG. 13. The coils of one phase, located in one layer, are connected concentrically (FIG. 13) in the winding diagram, offered in the given invention. As well as in the well-known scheme (FIG. 5) all concentric coils have equal number of turns. In the three-phase winding, the each phase has the two concentric coils, located in one layers. One side of coils of one phase occupies half of phase zone, other side of these coils is located in the same layer and occupies second half of phase zone (FIG. 12, FIG. 13). Coils of other phases in other layers are connected in the similar manner. Coils of phases occupy a phase zone, which equals of 180 electrical degrees for the three-phase electrical machine. As one can see from FIGS. 12, 13, the current in half of slots of the concentric coil of a phase has one direction, and in other half of slots has an opposite direction. Coils of one phase are located in one layer only. The coils of other phases located in other layers, are displaced relative each other in space on 120 electrical degrees for the three-phase electrical machine (FIG. 12, FIG. 13). Axes of coils of one phase, located in different layers, are displaced on 120 electrical degrees. Coils of phases consist of the concentric coils connected in series. For example, coils A6-X6, A5-X5, A4-X4, A3-X3, A2-X2 and A1-X1 of the phase A are connected consistently and form the common coil of phase A1-X6 (FIG. 12, FIG. 13). Where A1 represents the coil beginning, and X6 represents the coil end. Conductors of concentric coils on FIG. 12 are conditionally connected by a line to show their accessory to one coil of a phase. The number of layers is equal in the given winding to number of phases. As one can see from drawings (FIG. 13, FIG. 14), winding overhangs of such winding also don't intersect in space.

If one connects the concentric coils of one phase, located in different layers, by a counter manner, we would receive a scheme of a two-pole electrical machine (FIG. 13a). This means that it is necessary to connect the end X6 of one coil of the winding (FIG. 12, FIG. 13a) with the end X6' of another coil, located in the same layer of the winding. Then beginning A1 of one coil of the winding would represent the phase beginning. Beginning A1' of another coil, located in the same layer of the winding, would represent the phase end. The winding diagram of a two-pole electrical machine for one phase is presented on FIG. 15. Similarly, it is necessary to connect phases B and C. The beginnings of phases will represent: A1, B1 and C1 (FIG. 12, FIG. 13). The phases of the winding can be connected in wye or delta. The ends A1', B1' and C1' of the phases are connected to zero point 0 in case of wye-connection of phases (FIG. 12, FIG. 13a). The input wires of phases in the winding diagram we will definitively designate as A, B and C. As a result, we will receive a winding diagram of a two-pole electrical machine (FIG. 13a). As it is known, a closed surface of the stator of a two-pole electrical machine occupies in space 360 electrical degrees. Obviously, the zone occupied with one concentric coil of the phase, located in one layer, makes 180 electrical degrees (FIG. 12). In this case, that is, in case of a two-pole electrical machine, the phase zone is also equal to 180 mechanical degrees.

The winding diagram of the three-layer, three phase, two-pole windings with concentric coils, with 24 slots, with 180° phase zone, with connection of phases in wye, is presented on FIG. 13a. The picture of distribution of the magnetic field, created by this winding, is presented on FIG. 14a. The winding diagram of the three-layer, three phase, four-pole windings with concentric coils, with 24 slots, with 180° phase zone, with connection of phases in wye, is presented on FIG. 13b. The picture of distribution of the magnetic field, created by this winding, is presented on FIG. 14b.

Figure 15:
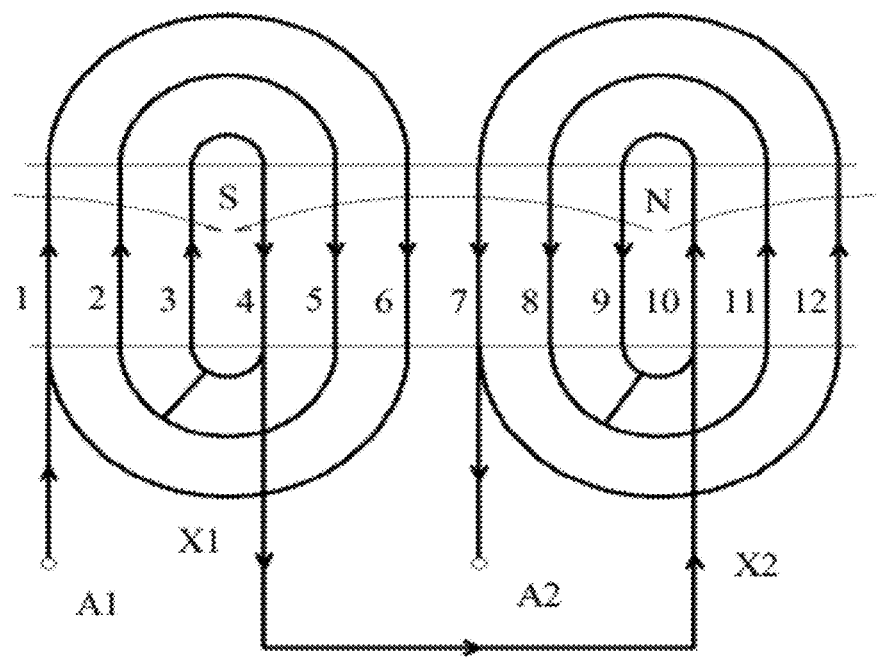
FIG. 15 shows the winding diagram of one phase, three-layer, three-phase, two-pole winding with concentric coils, with 12 slots, with 180° phase zone at series and parallel connection of coils of a phase.
Figure 15:
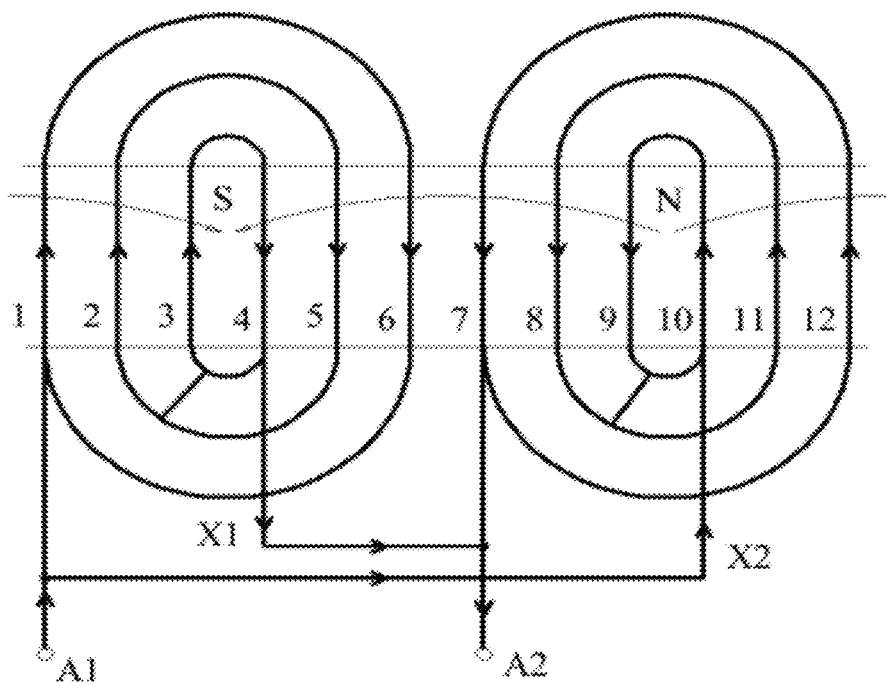

The winding diagram gives two-pole electrical machine in the elementary case (FIG. 15) at counter connection of coils of each phase, located in one layer. The given winding diagram at series and parallel connection of coils of the phase, located in one layer of a winding, for 12 slots of a winding, is shown on FIG. 15. The input wires of concentric coils of phases are designated (A1 and A2) (FIG. 15). The output wires of concentric coils of phases are designated (X1 and X2) (FIG. 15). The complete variant of the three phase, two-pole winding diagram with connection of phases of windings in wye is presented on FIG. 13a.

Figure 16:
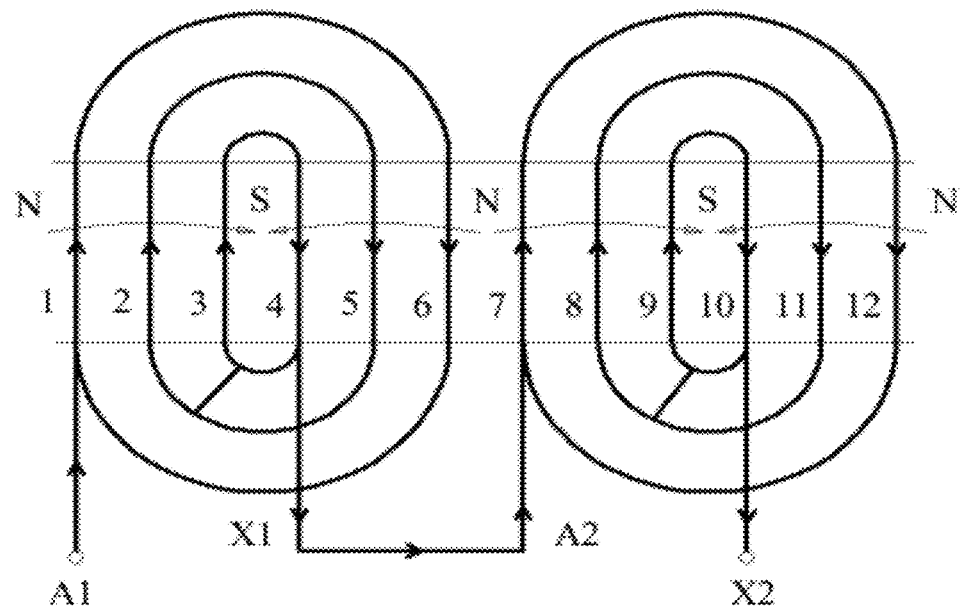
FIG. 16 shows the winding diagram of one phase, three-layer, three-phase, four-pole winding with concentric coils, with 12 slots, with 180° phase zone at series and parallel connection of coils of a phase.
Figure 16:
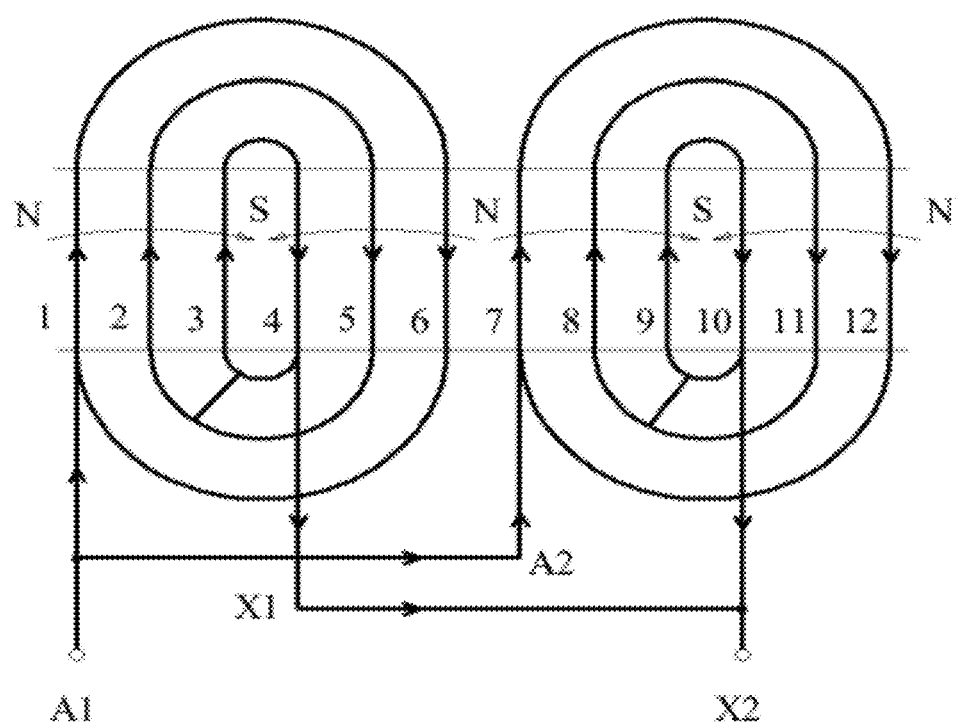

The winding diagram gives four-pole electrical machine in the elementary case (FIG. 16) at concordant connection of coils of each phase, located in one layer. The given winding diagram at series and parallel connection of coils of the phase, located in one layer of a winding, is shown on FIG. 16. The input wires of concentric coils of phases are designated (A1 and A2) (FIG. 16). The output wires of concentric coils of phases are designated (X1 and X2) (FIG. 16). The complete variant of a three phase, four-pole winding diagram with connection of phases of windings in wye is presented on FIG. 13b. For realization of the given scheme it is necessary to connect the end X6 of one coil of the winding (FIG. 12, FIG. 13b) with the beginning A1' of another coil, located in the same layer of the winding. Then the beginning A1 of one coil of the winding will represent the phase beginning. The end X6' of another coil, located in the same layer of the winding, will represent the phase end. Similarly, it is necessary to make connections for phases B and C. The beginnings of the phases will represent: A1, B1 and C1. The phases of the winding can be connected in wye or delta. The ends X6', Y6' and Z6' of the phases are connected to zero point 0 in the case of wye-connection of the phases. The input wires of the phases in the scheme we will definitively designate as A, B and C.

Thus, an elementary variant of the winding diagram (an elementary scheme) of the offered three-layer winding has six concentric coils for a three-phase scheme. Accordingly, each phase contains two concentric coils (FIG. 12, FIG. 13). In one layer of the winding there are two concentric coils, belonging to one phase. A concentric coil of a phase, located in one layer, in the elementary variant occupies a phase zone of 180 mechanical degrees which corresponds to 180 electrical degrees for a two-pole scheme (FIG. 12, FIG. 13a). The coils of phases, located in different layers of the winding, are displaced in space by 120 mechanical degrees for the elementary variant of the scheme (FIG. 12).

A distinctive feature of the given winding diagram is that at a counter connection of coils of the phase, located in the same layer, we achieve a two-pole (2p=2) electrical machine (FIG. 13a, FIG. 15). At a concordant connection of coils of the phase, located in the same layer, we achieve a four-pole (2p=4) electrical machine (FIG. 13b, FIG. 16). Thus, the number of concentric coils in the scheme does not change. Only the way of connection of coils of one phase changes. As the same scheme can give a two-pole and a four-pole electrical machine in the elementary case, for the size of the phase zone we take the size corresponding to the phase zone in mechanical degrees. In other words, for the size of the phase zone we take the size corresponding to the phase zone for a two-pole electrical machine.

It is obvious that if we increase the number of concentric coils of the winding diagram in comparison with the elementary variant (the elementary scheme) by any number of times, for example by k times, as a result we will achieve an electrical machine with a number of poles equal (2p=2·k) at a counter connection of coils of the phase or with a number of poles equal (2p=4·k) at a concordant connection of coils of the phase. It is a fact of common knowledge in the theory of windings of electrical machines. Here k shows the number of elementary winding diagrams (elementary schemes) in the whole winding diagram of the winding (the whole scheme of winding). The phase zone of the coil of one phase, located in one layer, in this case will be defined from the two-pole base variant (2p=2), that is for the scheme of the winding with a number of poles equal (2p=2·k). The phase zone of the coil of one phase, located in one layer, hence will be equal to 180 electrical degrees for any number of poles of a three-phase winding (see Table 3). The coils of other phases, located in other layers of the winding, will be displaced in space by 120 electrical degrees for any number of poles of a three-phase winding.

TABLE 3

| | Number fo winding layers n, (n = 3) (m = n = 3) | |
|---|---|---|
| Number of poles | $2p = 2k, k = 1, 2, 3, \ldots$ where k – the number of elementary schemes in the whole scheme of winding | $2p = 4k, k = 1, 2, 3, \ldots$ where k – the number of elementary schemes in the whole scheme of winding |
| Number of coils in one layer | $N_k = \dfrac{2m}{n}k = 2k$, where m – number of phases | $N_k = \dfrac{2m}{n}k = 2k$, where m – number of phases |
| Number of coils in one layer, which belong to one phase | $N_{kph} = 2k$ | $N_{kph} = 2k$ |
| Total number of coils | $M_k = n\dfrac{2m}{n}k = 2mk$ | $M_k = n\dfrac{2m}{n}k = 2mk$ |
| Number of coils, which belong to one phase | $M_{kph} = 2k$ | $M_{kph} = 2k$ |
| Phase zone for one concentric coil in electrical degrees | $\alpha_w = \dfrac{360k}{N_k} = \dfrac{180n}{m}$ for m = 3 $\alpha_w = 180°$ | $\alpha_w = \dfrac{360k}{N_k} = \dfrac{180n}{m}$ for m = 3 $\alpha_w = 180°$ |
| Number of slots in winding | $Z = 12ki, i = 1, 2, 3, \ldots$ $Z = 12, 24, 36, 48, \ldots$ | $Z = 12ki, i = 1, 2, 3, \ldots$ $Z = 12, 24, 36, 48, \ldots$ |
| Number of slots per pole and per phase | $q = \dfrac{Z}{2pm} = \dfrac{12 \cdot k \cdot i}{2 \cdot k \cdot 3} = 2i$ $q = 2, 4, 6, \ldots$ | $q = \dfrac{Z}{2pm} = \dfrac{12 \cdot k \cdot i}{4 \cdot k \cdot 3} = i$ $q = 1, 2, 3, \ldots$ |

The two-pole winding diagram of the given winding has the maximum pitch of a winding, which is equal $y_{max}=\tau$, where τ—pole division. The average pitch of the winding for the two-pole scheme is equal $$y_{av} = \frac{1}{2}\tau.$$

The four-pole winding diagram of the given winding has the maximum pitch of a winding, which is equal $y_{max}=2\tau$. The average pitch to the winding for the four-pole winding diagram is equal $y_{av}=\tau$. It is obvious that the two-pole winding diagram for the given winding is more preferable from the point of view of efficiency of use of the winding.

TABLE 4

| | Number of winding layers n = 3 (m = 3) | |
|---|---|---|
| Number of poles | 2p = 2 | 2p = 4 |
| Number of coils in one layer | $N_k = 2$ | $N_k = 4$ |
| Number of coils in one layer, which belong to one phase | $N_{kph} = 2$ | $N_{kph} = 2$ |
| Total number of coils | $M_k = 6$ | $M_k = 6$ |
| Number of coils, which belong to one phase | $M_{kph} = 2$ | $M_{kph} = 2$ |
| Phase zone for one concentric coil in electrical degrees | $\alpha_w = 180°$ | $\alpha_w = 180°$ |
| Number of slots in winding | $Z = 12ki, i = 1$ $Z = 12$ | $Z = 12ki, i = 1$ $Z = 12$ |

TABLE 4-continued

Number of winding layers n = 3 (m = 3)

Number of slots per pole and per phase $$q = \frac{Z}{2pm} = \frac{12 \cdot k \cdot i}{2 \cdot k \cdot 3} = 2i \quad q = \frac{Z}{2pm} = \frac{12 \cdot k \cdot i}{4 \cdot k \cdot 3} = i$$

$$q = 2 \qquad q = 1$$

The basic properties of a three-layer, m-phase winding with concentric coils for the two-pole and four-pole winding diagram are presented in Table 3.

The basic properties of a three-layer three-phase winding with concentric coils, with 12 slots for the two-pole and four-pole elementary winding diagram are presented in Table 4.

The general properties of offered concentric windings can be described as follows. Total number of coils in offered winding diagram of concentric windings equals $M_k=2mk$, where m is number of phases, and k is number of elementary schemes in whole scheme of winding. The number of coils in a layer equals $$N_k = \frac{2pm}{n}k,$$

where n is number of layers in a winding. The number of coils in a layer equals $N_k=2k$ for windings, at which the number of layers equals to number of phases (n=m). The number of coils in a layer, belonging to one phase, equals $M_{kph}=2k$ for windings, at which the number of layers equals to number of phases (n=m). The angle in space, occupied with one concentric winding, equals $$\alpha_w = \frac{360p}{\left(\frac{2pm}{n}\right)} = \frac{180}{\left(\frac{m}{n}\right)} = \frac{180n}{m}$$

electrical degrees. This angle is called as a phase zone. Coils of phases are displaced from each other in space on the angle, which equals $$\alpha_{coils} = \frac{360}{m}$$

electrical degrees.

Number of concentric coils in the coil of one phase, located in one layer, for the two-layer (n=2), three-phase winding (m=3) (FIGS. 7, 8, 10, 11), equals $$n_{coils} = \frac{Z}{2N_k} = \frac{2mki}{2mk} = i$$

where i=2, 3, 4, . . . , (see Table 1). Thus, in Table 1 i shows the number of concentric coils in the coil of one phase.

The minimum number of slots in a two-layer (n=2) three-phase (m=3) winding with concentric coils equals $Z_{min}=12$. The minimum number of concentric coils in one coil of the phase equals $n_{coils}=2$, as if the number of coils in one coil of the phase equals $n_{coils}=1$, the winding degenerates to a concentrated winding. The number of slots in one coil equals 2.

The minimum number of slots in one concentric coil of the phase equals $Z_{min}^{coils}=2 \cdot 2=4$. The minimum number of slots in the winding is defined by the number of slots in one layer $Z_{min}=m \cdot n_{min}^{coils}=m \cdot 2 \cdot n_{coils}=3 \cdot 2 \cdot 2=12$. Number of slots in the winding equals $Z=2N_k n_{coils}=2mki$, where 2—number of slots in one coil, $N_k$—number of coils in one layer of the winding (see Table 1).

The maximum pitch of the winding, for two-layer (n=2) a three-phase winding (m=3) (FIGS. 8, 10, 11), equals $$y_{max} = \frac{Z}{mk} - 1 = \frac{2mki}{mk} - 1 = 2i - 1.$$

The pitch of coils for two-layer (n=2) a three-phase winding (m=3) (FIGS. 8, 10, 11), changes under the law $$y_l = y_{max} - 2(l-1),$$

where l=1, 2, 3, . . . , i—coil number.

For example, for two-layer (n=2) a three-phase winding (m=3) a four-pole winding (FIGS. 7, 8) for i=3, $y_{max}=2i-1=2 \cdot 3-1=5$, $l_{max}=i=3$:

| Number of coil l | Pitch y |
|---|---|
| 1 | 5 |
| 2 | 3 |
| 3 | 1 |

The coil (A1-X1) has the maximum pitch. The coil (A3-X3) has the minimum pitch (FIG. 7).

Number of concentric coils in the coil of one phase, located in one layer, for the three-layer (n=3), three-phase winding (m=3) (FIGS. 13, 15, 16), equals $$n_{coils} = \frac{Z}{2N_k} = \frac{12 \cdot k \cdot i}{2 \cdot 2 \cdot k} = 3i,$$

where i=1, 2, 3, . . . , (see Table 3).

The minimum number of slots in a three-layer three-phase winding with concentric coils equals $Z_{min}=12$. The number of slots in a three-layer three-phase winding with concentric coils should be a multiple of 3, as coils of phases are displaced in space by the angle $$\alpha_{coils} = \frac{360°}{m}$$

multiple of the number of phases (m=3). The number of slots in a three-layer three-phase winding with concentric coils should be also a multiple of 2, as in one layer there are two concentric coils of one phase. The number of slots in one concentric coil of the phase should be a multiple of 2, as each coil requires two slots. Thus, the number of slots in a three-layer, three-phase winding with concentric coils should be a multiple of $3 \cdot 2 \cdot 2=12$. Hence, the minimum number of slots in a three-layer, three-phase winding with concentric coils equals $Z_{min}=12$. The minimum number of coils in one concentric coil of the phase of a three-layer, three-phase winding equals $$n_{coils} = \frac{Z_{min}}{2N_k} = \frac{12}{2 \cdot 2} = 3,$$

where $N_k$—the number of coils in one layer of the winding, 2—the number of slots per coil (see Table 3, 4). The number of slots in the winding equals $Z=2N_k n_{coils}=2 \cdot 2k \cdot 3i=12ki$, where 2—the number of slots in one coil, $N_k=2k$—the number of coils in one layer of the winding (see Table 3).

The maximum pitch of the winding, for a three-layer (n=3) three-phase winding (m=3) (FIGS. 13, 15, 16), equals $$y_{max} = \frac{Z}{2k} - 1 = \frac{12ki}{2k} - 1 = 6i - 1.$$

The pitch of coils for a three-layer (n=3) three-phase winding (m=3) (FIGS. 13, 15, 16), changes according to the law $$y_l = y_{max} - 2(l-1),$$

where $l=1, 2, 3, \ldots, 3i$—the coil number.

For example, for a three-layer (n=3) three-phase (m=3) two-pole winding (FIGS. 13, 15) for i=1, $y_{max}=6i-1=6 \cdot 1-1=5$, $l_{max}=3i=3$:

| Number of coil l | Pitch y |
|---|---|
| 1 | 5 |
| 2 | 3 |
| 3 | 1 |

For i=2, $y_{max}=6i-1=6 \cdot 2-1=11$, $l_{max}=3i=6$:

| Number of coil l | Pitch y |
|---|---|
| 1 | 11 |
| 2 | 9 |
| 3 | 7 |
| 4 | 5 |
| 5 | 3 |
| 6 | 1 |

The coil (A1-X1) has the maximum pitch. The coil (A6-X6) has the minimum pitch (FIG. 12).

Figure 17:
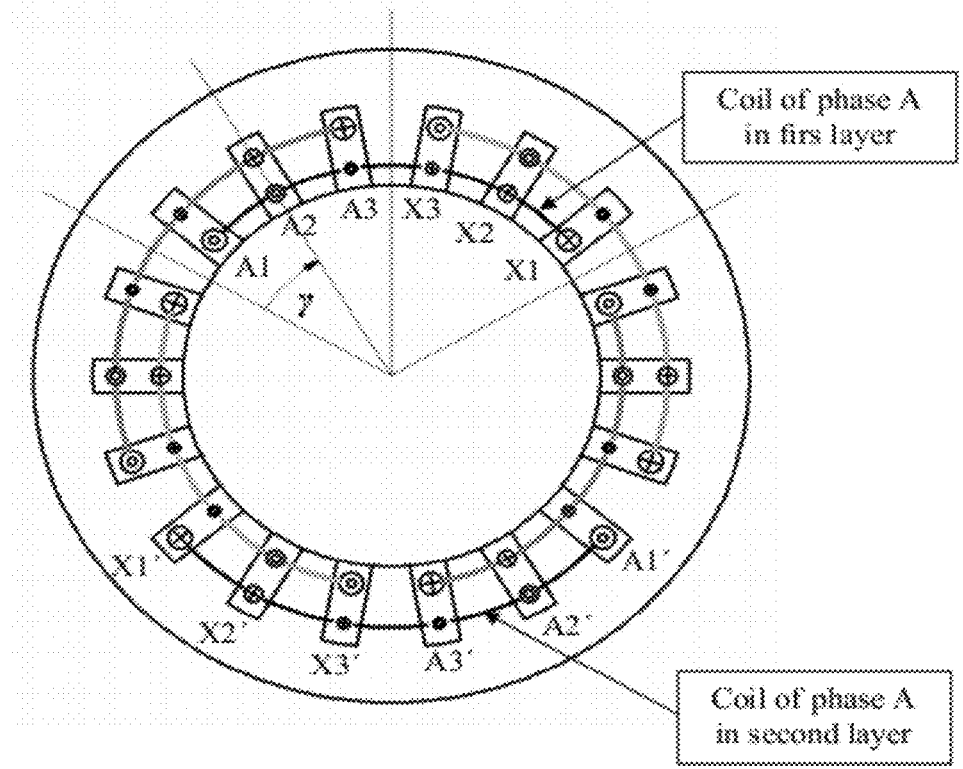
FIG. 17 shows the principle scheme of two-layer, three-phase winding with concentric coils, with 120° phase zone with linear distribution of turns in concentric coils.
Figure 18:
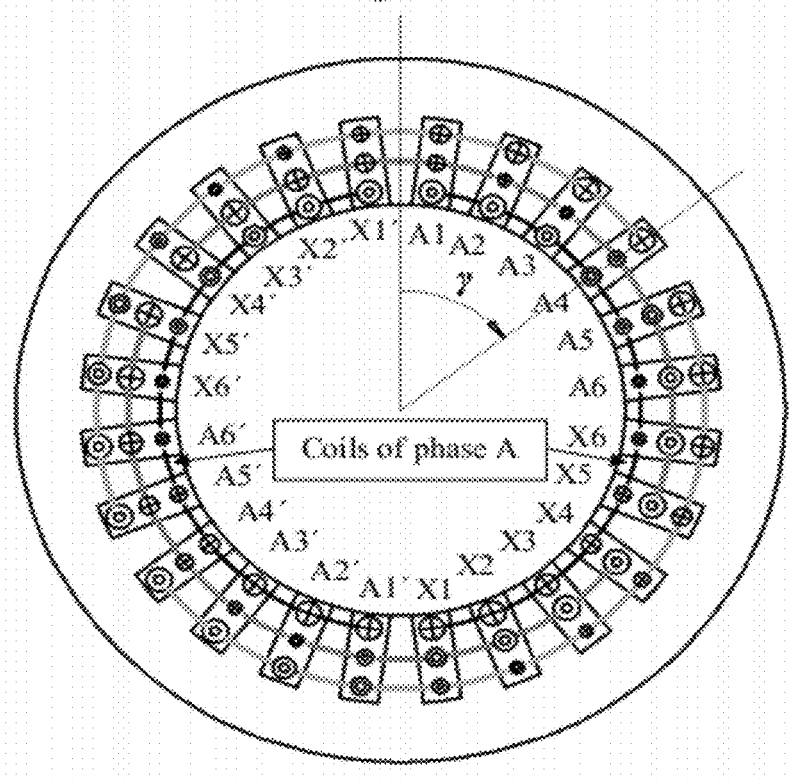
FIG. 18 shows the principle scheme of three-layer, three-phase winding with concentric coils, with 180° phase zone with trapezoidal distribution of turns in concentric coils.

A sinusoidal distribution of turns in the concentric coils, which form the coils of a phase, is possible to use for improvement of the form of curve of MMF of offered windings. Principle schemes of sinusoidal distribution of turns in concentric coils of a phase for two-layer and three-layer, three-phase windings are presented on FIGS. 17, 18. The winding diagrams of these schemes are presented on FIG. 8 and FIG. 13. Numbers of turns in concentric coils $w_{coil}$ versus a coil coordinate lengthways of the stator bore or from the angle $\gamma$ (FIGS. 17, 18) changes under the sine law. For a two-layer concentric winding, the number of turns in concentric coils $w_{coil}$ equals:

$$w_{coil} = \sin\left(\frac{\pi}{2} - \frac{\pi}{\alpha_w}\gamma\right).$$

For a two-layer, three-phase concentric winding (FIG. 17), the number of turns in concentric coils $w_{coil}$ equals:

$$w_{coil} = \sin\left(\frac{\pi}{2} - \frac{3}{2}\gamma\right),$$

where the angle $\gamma$ changes from 0 to 60° electrical degrees. For a three-layer, three-phase concentric winding, the number of turns in concentric coils $w_{coil}$ equals:

$$w_{coil} = \sin\left(\frac{\pi}{2} - \gamma\right),$$

where the angle $\gamma$ changes from 0 to 90° electrical degrees.

Figure 19:
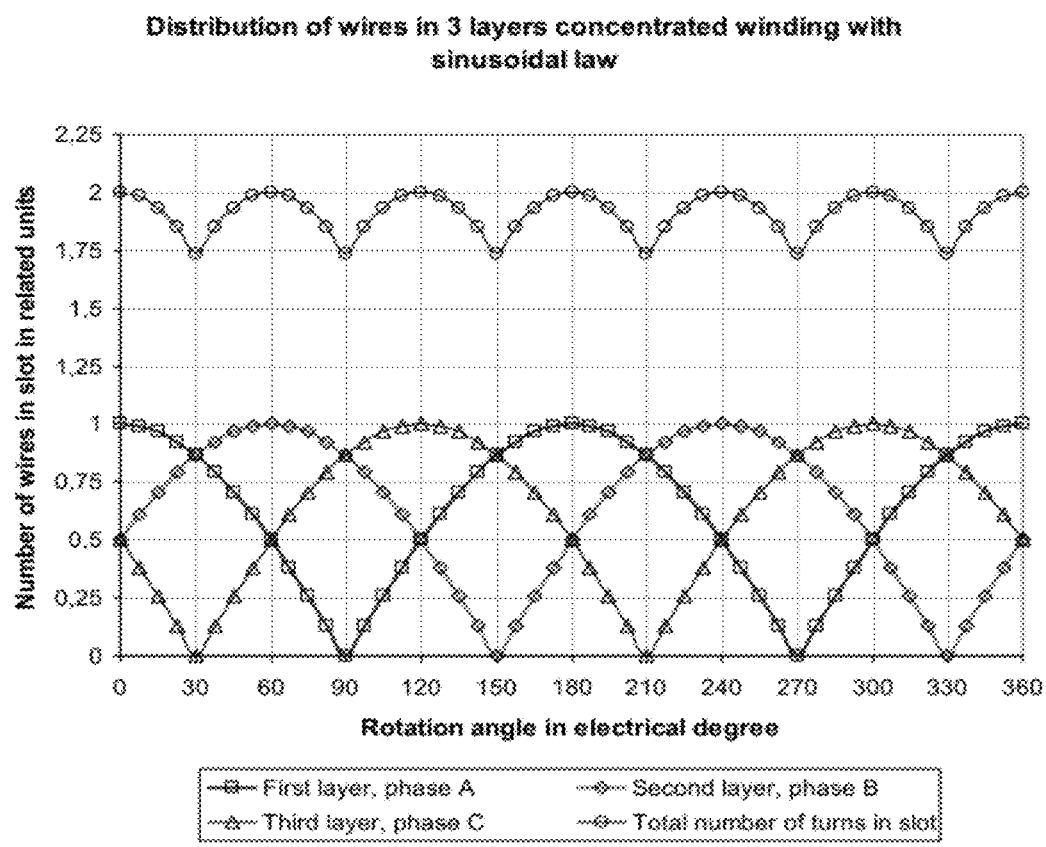
FIG. 19 shows the resulting distribution of turns in the three-layer, three-phase winding with concentric coils, with 180° phase zone in case of sinusoidal law of distribution.
Figure 21:
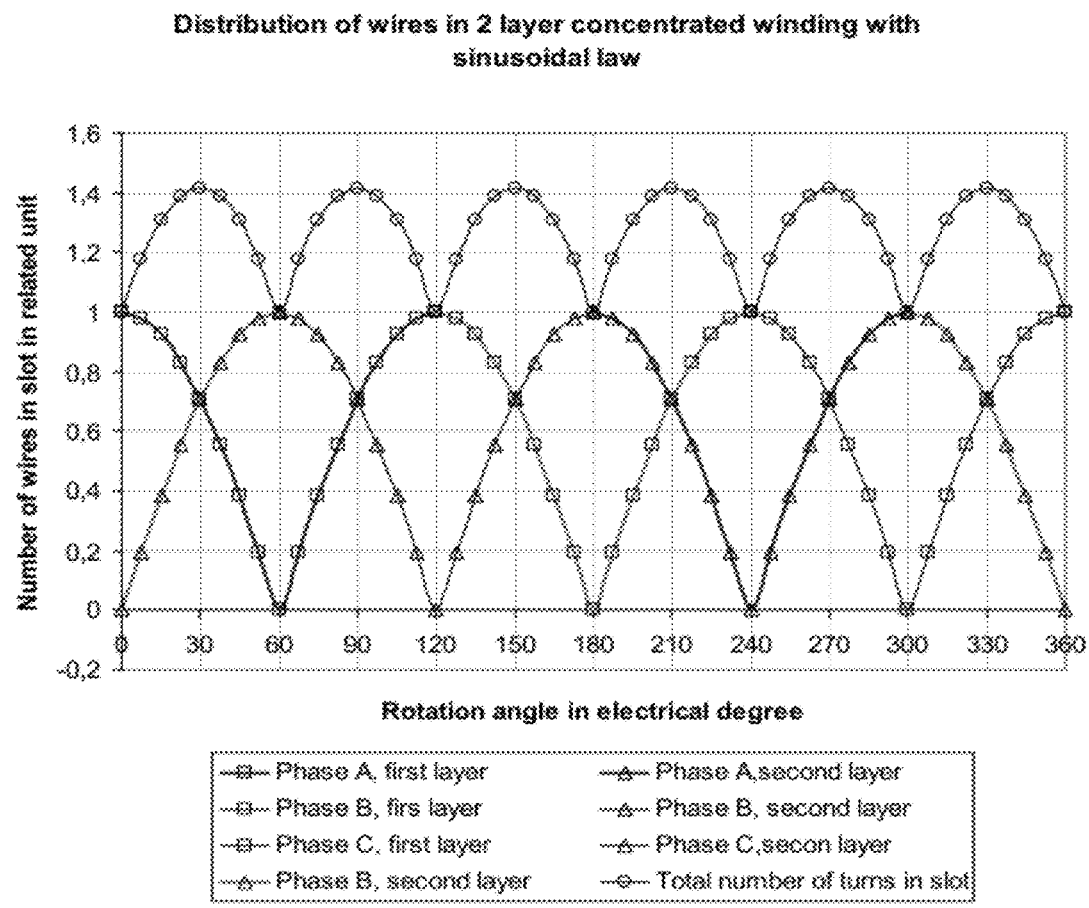
FIG. 21 shows the resulting distribution of turns in the two-layer, three-phase winding with concentric coils, with 120° phase zone in case of sinusoidal law of distribution.

Researches show that the number of turns and the number of conductors in slots isn't constant value at sinusoidal distribution of turns in coils of phases of a two-layer or three-layer three-phase concentric winding (FIGS. 19, 21).

Figure 20:
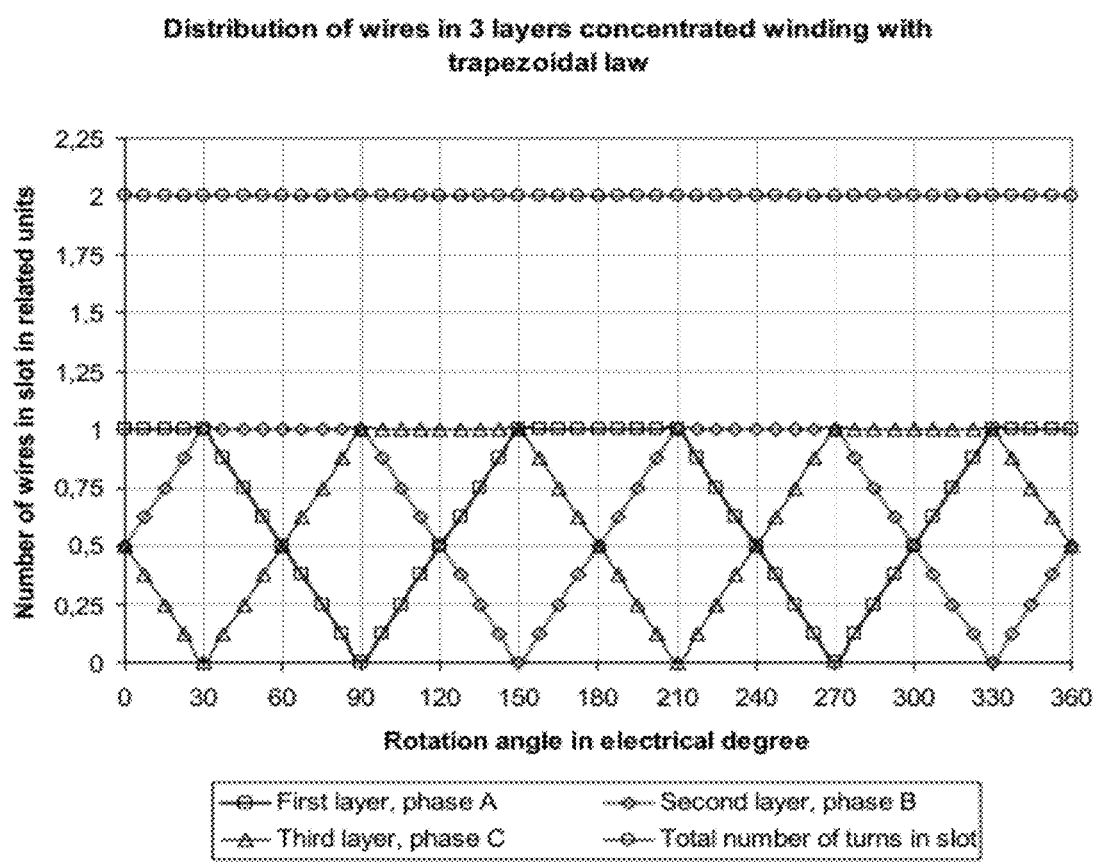
FIG. 20 shows the resulting distribution of turns in the three-layer, three-phase winding with concentric coils, with 180° phase zone in case of trapezoidal law of distribution.

For a three-layer, three-phase concentric winding, the number of turns and the number of conductors in slots will be a constant value at trapezoidal distribution of turns in concentric coils of a phase (FIG. 20). The basis of trapezium, where the number of conductors in slots is the maximum value, equals to 60° electrical degrees. One coil has only half of these 60° electrical degrees. So, one coil has 30° electrical degrees. At the change of the angle $\gamma$ from 30 to 90° electrical degrees, a distribution of turns in concentric coils of a phase changes under the linear law: from the maximum value to zero at infinitude of slots in the winding or to the minimum value at finite number of slots in the winding. The number of concentric coils in coils of a phase for such winding equals $n_{coils}=3i$. The phase zone of such winding equals of 180° electrical degrees. On half of one coils of a phase it is necessary 90°. Then on 30° electrical degrees it is necessary i coils. Thus, the change of the angle $\gamma$ from 0 to 30° electrical degrees, the number of turns in i coils is the maximum and the constant. Thus, the pitch of these coils changes from the maximum $y_{max}=6i-1$ to a pitch equal $y_{l=i}=y_{max}-2(i-1)$. The number of turns changes from maximum to the minimum value under the linear law at the further change of an angle $\gamma$ from 30 to 90° electrical degrees in the others 2i coils. Thus the pitch of these coils changes from a pitch equal $y_{l=i+1}=y_{max}-2i$, to the minimum pitch equal 1. The total number of turns and conductors in each slot of a winding is to constants (FIG. 20) at the specified distribution of turns in concentric coils of phases.

Figure 22:
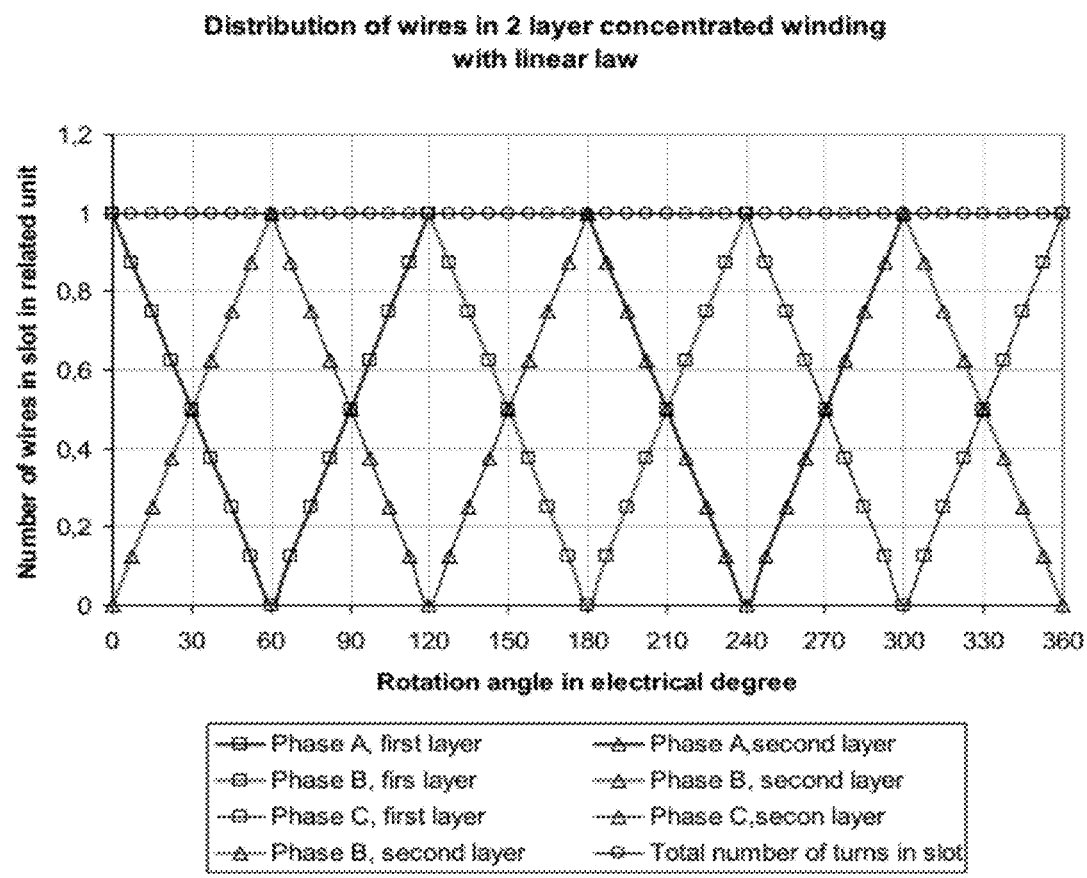
FIG. 22 shows the resulting distribution of turns in the two-layer, three-phase winding with concentric coils, with 120° phase zone in case of linear law of distribution.

The number of turns and the number of conductors in slots will be the constant value at linear distribution of turns in concentric coils of a phase (FIG. 22) for a two-layer, three-phase concentric winding. At the change of the angle $\gamma$ from 0 to 60° electrical degrees the number of turns in concentric coils of a phase changes from the maximum value at the coil having the maximum pitch $y_{max}$, to the minimum value at the coil, the having minimum pitch equal 1. The total number of turns and conductors in each slot of the winding is to constants (FIG. 22) at the specified distribution of turns in concentric coils of phases.

Offered windings can be applied and to conventional electrical machines. Absence of a intersection of winding overhangs can considerably raise a quality of the plunger technology of assemblage of windings.

The two-layer, three-phase concentric winding with linear distribution of turns in the concentric coils of a phase has improved distribution of MMF and can be applied to the electrical machines used in the high-precision electrical drive.

The three-layer, three-phase concentric winding with trapezoidal distribution of turns in the concentric coils of a phase has improved distribution of MMF and can be also applied to the electrical machines used in the high-precision electrical drive.

What is claimed is:

1. A two-layer, m-phase winding of electrical machine of alternating current with concentric coils comprising the following combination of properties:
   a) coils of each phase situated in different layers of the winding, can be connected in series or in parallel so that electric current flowing through these coils would create magnetic field either having the number of poles of 2p=2k or of 2p=4k, where k=1, 2, 3, . . . ;
   b) the total number of coils equals 2mk;
   c) the number of coils in one layer of the winding equals mk;
   d) the number of coils in one layer of the winding, belonging to each phase, equals k;
   e) the number of coils of the winding, belonging to each phase, equals 2k;
   f) the phase coils situated in one layer of the winding, are displaced with respect to each other on the angle equal to $$\frac{360}{m}$$

electrical degrees;
   g) the phase coils situated in different layers of the winding, are displaced with respect to each other on the angle equal to 180 electrical degrees;
   h) the phase zone of each coil equals $$\frac{360}{m}$$

electrical degrees;
   i) the phase zone includes one coil, consisting of i concentric coils connected in series and having equal number of turns;
   j) the number of slots in the winding equals Z=2mki, where i=2, 3, 4, . . . is the number of concentric coils in a phase coil;
   k) the pitch of concentric coils of the phase changes from the maximum, equal to $y_{max}=2i-1$, down to the minimum, equal 1, under the law $y_l=y_{max}-2(l-1)$, where l=1, 2, 3, . . . i;
   l) the endwindings of coils of different phases and different layers remain in a single layer.

2. The winding, according to claim 1, in which the number of turns in concentric coils of phases changes according to the linear law from the maximum number of turns at the concentric coil having the maximum pitch, equal to $y_{max}=2i-1$, down to the minimum number of turns at the concentric coil having the minimum pitch, equal to 1, thereat the total number of turns and conductors in each slot of the winding is a constant value.

3. A three-layer, three-phase winding of electrical machine of alternating current with concentric coils comprising the following combination of properties:
   a) the number of layers equals to the number of phases;
   b) coils of each phase situated in different layers of the winding, can be connected in series or in parallel so that electric current flowing through these coils would create magnetic field either having a number of poles of 2p=2k or of 2p=4k, where k=1, 2, 3, . . . ;
   c) the total number of coils equals 6k;
   d) the number of coils in one layer of the winding equals 2k;
   e) the number of coils in one layer of the winding, belonging to each phase, equals 2k;
   f) the coils of one phase are situated only in one layer of the winding;
   g) the coils of phase, which are situated in different layers of the winding, are displaced with respect to each other on the angle equal to 120 electrical degrees;
   h) the phase zone of each coil equals 180 electrical degrees;
   i) the phase zone includes one coil, consisting of 3i concentric coils connected in series and having equal number of turns;
   j) the number of slots in the winding equals Z=12ki, where i=1, 2, 3, . . . is the number of concentric coils in a phase coil;
   k) the pitch of concentric coils of the phase changes from the maximum, equal to $y_{max}=6i-1$, down to the minimum, equal to 1, according to the following law:

$$y_l=y_{max}-2(l-1), \text{ where } l=1,2,3,\ldots 3i;$$

l) the endwindings of coils of different phases and different layers remain in a single layer.

4. The winding, according to claim 2, in which the number of turns in concentric coils of phases changes according to the trapezoidal law, where in i concentric coils the pitch changes from the maximum equal to $y_{max}=6i-1$ down to the pitch equal to $y_{l=i}=y_{max}-2(i-1)$ and the number of turns is maximal and constant, in the other 2i concentric coils where the pitch changes from pitch equal to $y_{l=i+1}=y_{max}-2$ down to the minimum pitch, equal to 1, the number of turns changes according to the linear law from the maximum number of turns down to the minimum number of turns, thereat the total number of turns and conductors in each slot of the winding is a constant value.

* * * * *